United States Patent
Budnik et al.

[11] Patent Number: 6,081,348
[45] Date of Patent: Jun. 27, 2000

[54] ROS BEAM FAILURE DETECTOR

[75] Inventors: Roger W. Budnik, Rochester; James M. Pacer, Webster; Guru B. Raj, Fairport; Ralph A. Shoemaker, Rochester; Michael G. Swales, Sodus, all of N.Y.

[73] Assignee: Xerox Corporation, Stamford, Conn.

[21] Appl. No.: 09/035,124

[22] Filed: Mar. 5, 1998

[51] Int. Cl.⁷ .............................. H04N 1/40; G06K 9/00
[52] U.S. Cl. ............................. 358/406; 382/112
[58] Field of Search ..................... 358/404, 406, 358/456, 480, 510, 534, 475, 448; 382/112, 141

[56] References Cited

U.S. PATENT DOCUMENTS

| | | | |
|---|---|---|---|
| 4,999,673 | 3/1991 | Bares | 355/208 |
| 5,023,817 | 6/1991 | Au et al. | 364/550 |
| 5,038,319 | 8/1991 | Carter et al. | 364/900 |
| 5,057,866 | 10/1991 | Hill, Jr. et al. | 355/200 |
| 5,138,377 | 8/1992 | Smith et al. | 355/207 |
| 5,436,705 | 7/1995 | Raj | 355/246 |
| 5,533,193 | 7/1996 | Roscoe | 395/183.15 |
| 5,543,896 | 8/1996 | Mestha | 355/208 |
| 5,619,307 | 4/1997 | Machino et al. | 399/11 |
| 5,636,008 | 6/1997 | LoBiondo et al. | 399/8 |
| 5,694,637 | 12/1997 | Yoshino et al. | 399/38 |
| 5,731,884 | 3/1998 | Inoue | 358/456 |
| 5,859,933 | 1/1999 | Sasanuma | 382/275 |

Primary Examiner—Jerome Grant, II
Attorney, Agent, or Firm—Ronald F. Chapuran; Paul A. Schnose

[57] ABSTRACT

A method to provide a highly intelligent, automated diagnostic system that identifies the need to replace specific parts to minimize machine downtime rather than require extensive service troubleshooting. In particular, a systematic, logical test analysis scheme to assess machine operation from a simple sensor system and to be able to pinpoint parts and components needing replacement is provided by a series of first level of tests by the control to monitor components for receiving a first level of data and by a series of second level of tests by the control to monitor components for receiving a second level of data. Each of the first level tests and first level data is capable of identifying a first level of part failure independent of any other test. Each of the second level tests and second level data is a combination of first level tests and first level data or a combination of a first level test and first level data and a third level test and third level data. The second level tests and second level data are capable of identifying second and third levels of part failure. Codes are stored and displayed to manifest specific part failures.

15 Claims, 15 Drawing Sheets

ROS BEAM FAILURE DETECTOR

BACKGROUND OF THE INVENTION

The invention relates to analysis of xerographic processes, and more particularly, to the precise determination of failed parts within the xerographic process.

As reproduction machines such as copiers and printers become more complex and versatile, the interface between the machine and the service representative must necessarily be expanded if full and efficient trouble shooting of the machine is to be realized. A suitable interface must not only provide the controls, displays, fault codes, and fault histories necessary to monitor and maintain the machine, but must do so in an efficient, relatively simple, and straightforward way. In addition, the machine must be capable of in depth self analysis and either automatic correction or specific identification of part failure to minimize service time.

Diagnostic methods often require that a service representative perform an analysis of the problem. For example, problems with paper movement in a machine can occur in different locations and occur because of various machine conditions or failure of various components. In the prior art, this analysis by the service representative has been assisted by recording fault histories in the machine control to be available for readout and analysis. For example, U.S. Pat. No. 5,023,817, assigned to the same assignee as the present invention, discloses a method for recording and displaying in a finite buffer, called a last 50 fault list, machine faults as well as fault trends or near fault conditions. This data is helpful in diagnosing a machine. It is also known in the prior art, to provide a much larger data log, known as an occurrence log, to record a variety of machine events.

In addition U.S. Pat. No. 5,023,817, assigned to the same assignee as the present invention, discloses a technique to diagnose a declared machine fault or a suspected machine fault by access to a library of fault analysis information and the option to enter fault codes to display potential machine defects related to the fault codes. It is also known, as disclosed in U.S. Pat. No. 5,533,193 to save data related to given machine events by selectively setting the control to respond to the occurrence of a given machine fault or event, monitoring the operation of the machine for the occurrence of the given machine event, and initiating the transfer of the data in a buffer to a non-volatile memory.

It is also known to be able to monitor the operation of a machine from a remote source by use of a powerful host computer having advanced, high level diagnostic capabilities. These systems have the capability to interact remotely with the machines being monitored to receive automatically initiated or user initiated requests for diagnosis and to interact with the requesting machine to receive stored data to enable higher level diagnostic analysis. Such systems are shown in U.S. Pat. Nos. 5,038,319, and 5,057,866 owned by the assignee of the present invention. These systems employ Remote Interactive Communications to enable transfer of selected machine operating data (referred to as machine physical data) to the remote site at which the host computer is located, through a suitable communication channel. The machine physical data may be transmitted from a monitored document system to the remote site automatically at predetermined times and/or response to a specific request from the host computer.

The host computer may include a compiler to allow communication with a plurality of different types of machines and an expert diagnostic system that performs higher level analysis of the machine physical data than is available from the diagnostic system in the machine. After analysis, the expert system can provide an instruction message which can be utilized by the machine operator at the site of the document system to overcome a fault. Alternatively, if the expert system determines that more serious repair is necessary or a preventive repair is desirable, a message can be sent to a local field office giving a indication of the type of service action required.

Also, U.S. Pat. No. 5,636,008, assigned to the same assignee as the present invention, discloses a technique for remote access and diagnostic manipulation of a machine for improved preparation before making a service call.

It is expected that future office products could be serviced by a variety of individuals that could include the customer, representative of product manufactures, or third party service organizations. The service may include parts repair or replacements, adjustments or software updates and should be made as conveniently and readily available as possible. In order to meet this new level of convenient service in an ever complex set of products, it is necessary to provide rapid, easily interpretable information on the status of the machines, to those that are likely to service the product.

The use of expert systems discussed above, are also well known in the art. For example, it is known to provide a computer controlled diagnostic apparatus for industrial or other types of operating systems. A rule base pertinent to the particular operating system being diagnosed is stored in memory. The rule base is established by experts in the field to which the diagnosis pertains. Sensors monitor operating parameters of the system and provide output signals which are fed to the diagnostic apparatus. Indications of the overall "health" of the operating system in general and of its components in particular are provided to the user via a display. In addition, U.S. Pat. No. 5,138,377 discloses an internal expert system to aid in servicing which monitors predetermined status conditions of the machine for automatic correction or for communication to the user.

A difficulty with prior art diagnostic services is the inability to easily and automatically pinpoint the precise parts or subsystems in a machine causing a malfunction or deteriorating condition. It would be much more economical to be able to simply replace a part than to exert significant time and effort trying to correct or repair the part. This is the trend in today's high tech system environment. It would be desirable, therefore, to provide a highly intelligent, automated diagnostic system that provides an indication of the need to replace specific parts or subsystems rather than the need for extensive service troubleshooting to minimize machine downtime.

In copying or printing systems, such as a xerographic copier, laser printer, or ink-jet printer, a common technique for monitoring the quality of prints is to artificially create a "test patch" of a predetermined desired density. The actual density of the printing material (toner or ink) in the test patch can then be optically measured to determine the effectiveness of the printing process in placing this printing material on the print sheet.

In the case of xerographic devices, such as a laser printer, the surface that is typically of most interest in determining the density of printing material thereon is the charge-retentive surface or photoreceptor, on which the electrostatic latent image is formed and subsequently, developed by causing toner particles to adhere to areas thereof that are charged in a particular way. In such a case, the optical device for determining the density of toner on the test patch, which is often referred to as a toner area coverage sensor or "densitometer", is disposed along the path of the photoreceptor, directly downstream of the development of the development unit. There is typically a routine within the operating system of the printer to periodically create test patches of a desired density at predetermined locations on the photoreceptor by deliberately causing the exposure system thereof to charge or discharge as necessary the surface at the location to a predetermined extent.

The test patch is then moved past the developer unit and the toner particles within the developer unit are caused to adhere to the test patch electrostatically. The denser the toner on the test patch, the darker the test patch will appear in optical testing. The developed test patch is moved past a densitometer disposed along the path of the photoreceptor, and the light absorption of the test patch is tested; the more light that is absorbed by the test patch, the denser the toner on the test patch. Xerographic test patches are traditionally printed in the interdocument zones on the photoreceptor. Generally each patch is about an inch square that is printed as a uniform solid half tone or background area. Thus, the traditional method of process controls involves scheduling solid area, uniform halftones or background in a test patch. Some of the high quality printers contain many test patches.

It would be desirable, therefore, to be able to use a simple toner area coverage sensor rather than a complex sensor system to provide machine data to be able to diagnose a machine and identify specific part or subsystem failures or malfunctions. It would also be desirable to provide a systematic, logical test analysis scheme to assess machine operation from a simple sensor system and to be able to pinpoint parts, components, and subsystems needing replacement.

It is an object of the present invention, therefore, to be able to determine first and second laser beam failures by comparing to a reference signal halftone developed signals from plural test patches. It is another object of the present invention to provide a new an improved technique for machine diagnosis, in particular, to be able to identify precise components or parts for replacement to maintain machine operation. It is still another object of the present invention to provide a systematic, logical test analysis scheme to assess machine operation from a simple sensor system and to be able to pinpoint parts and components needing replacement.

Other advantages of the present invention will become apparent as the following description proceeds, and the features characterizing the invention will be pointed out with particularity in the claims annexed to and forming a part of this specification.

SUMMARY OF THE INVENTION

The invention includes a highly intelligent, automated diagnostic system that identifies the need to replace specific parts to minimize machine downtime rather than require extensive service troubleshooting. In particular, a systematic, logical test analysis scheme to assess machine operation from a simple sensor system and to be able to pinpoint parts and components needing replacement is provided by a series of first level of tests by the control to monitor components for receiving a first level of data and by a series of second level of tests by the control to monitor components for receiving a second level of data. Each of the first level tests and first level data is capable of identifying a first level of part failure independent of any other test. Each of the second level tests and second level data is a combination of first level tests and first level data or a combination of a first level test and first level data and a third level test and third level data. The second level tests and second level data are capable of identifying second and third levels of part failure. Codes are stored and displayed to manifest specific part failures.

DETAILED DESCRIPTION OF THE DRAWINGS

For a better understanding of the present invention, reference may be had to the accompanying drawings wherein the same reference numerals have been applied to like parts and wherein.

Figure 8A:
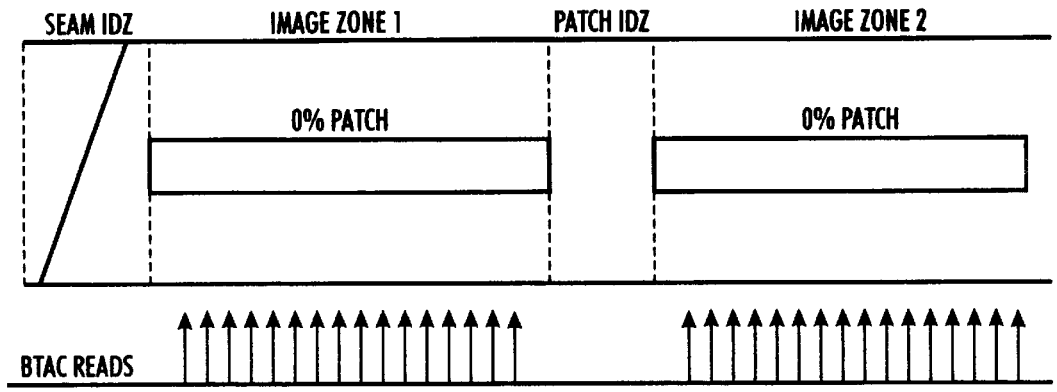
Figure 8B:
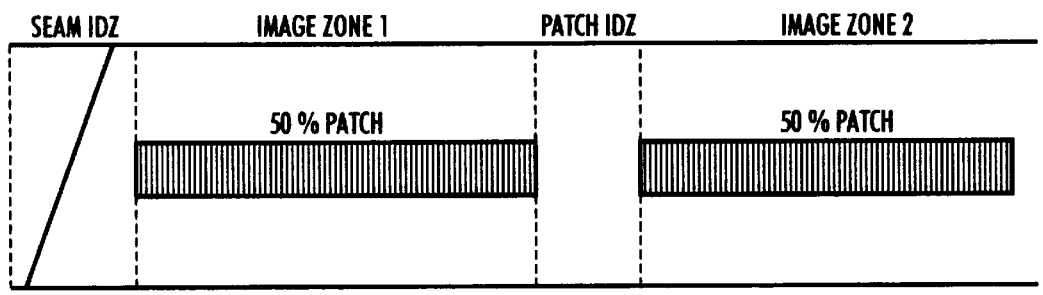
Figure 8C:
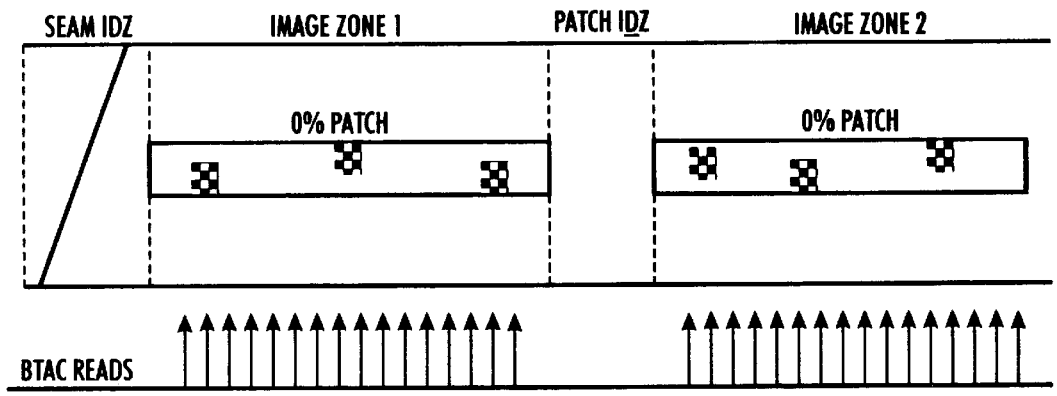
Figure 9A:
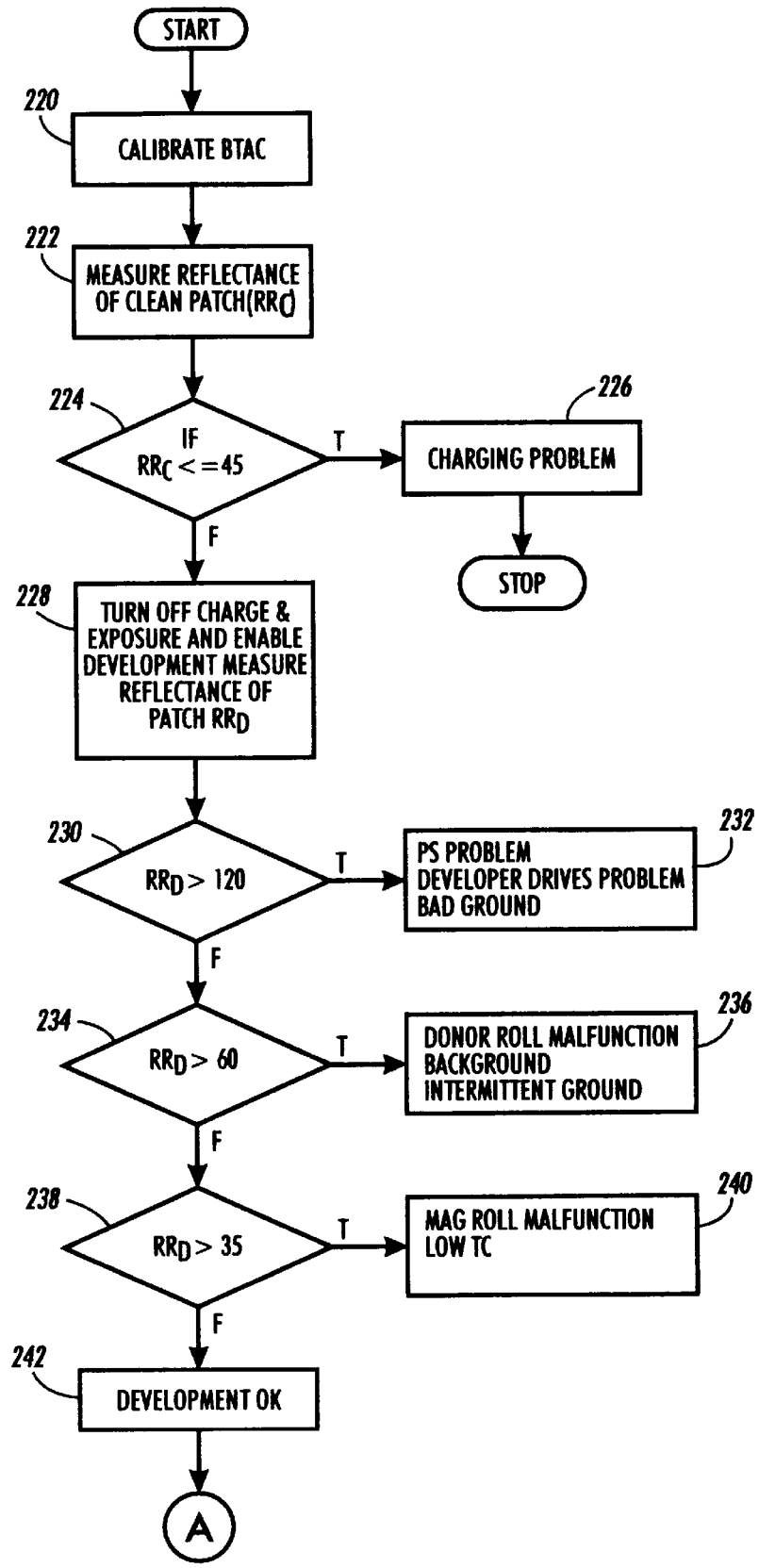
Figure 9B:
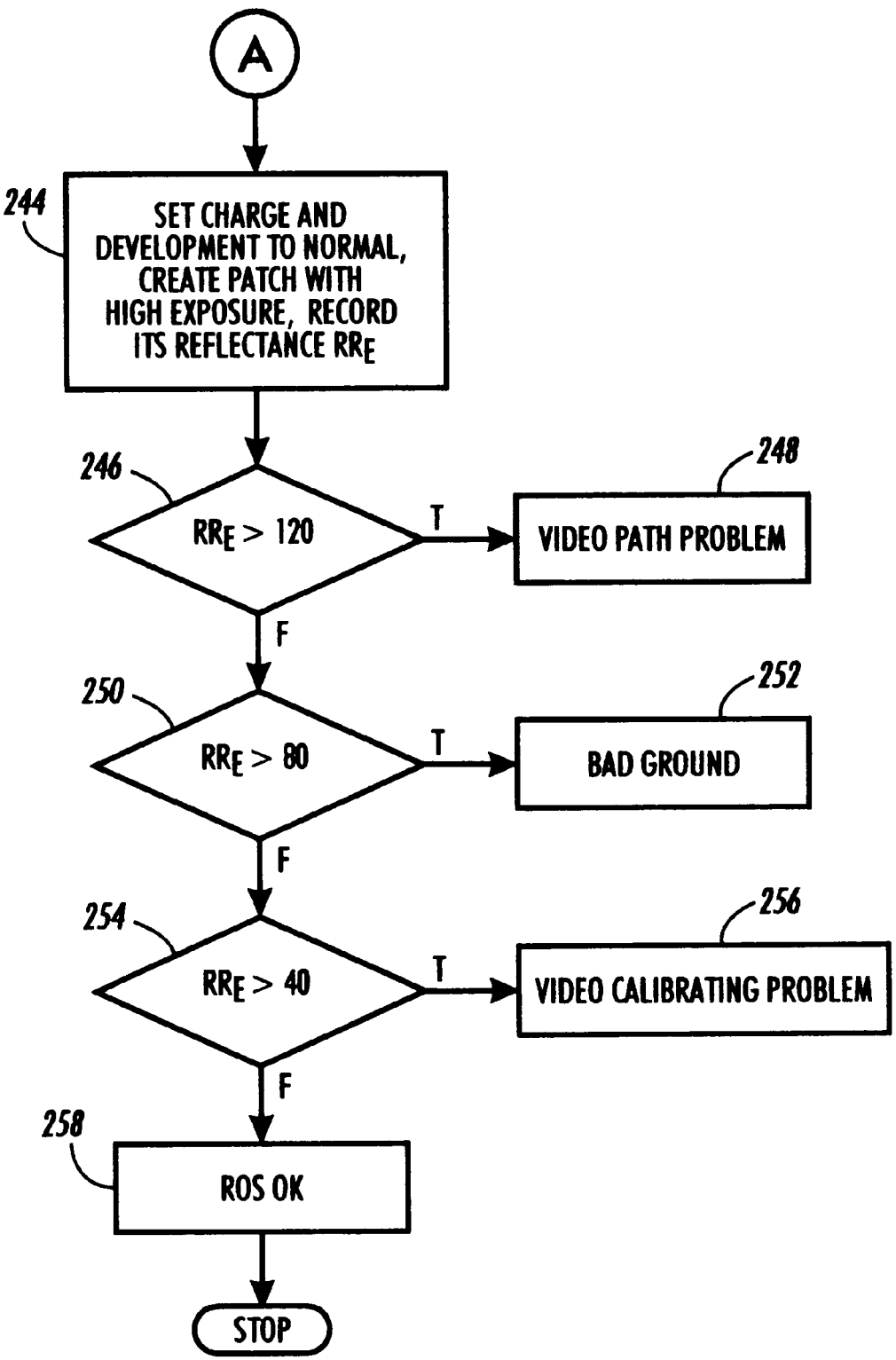
Figure 10:
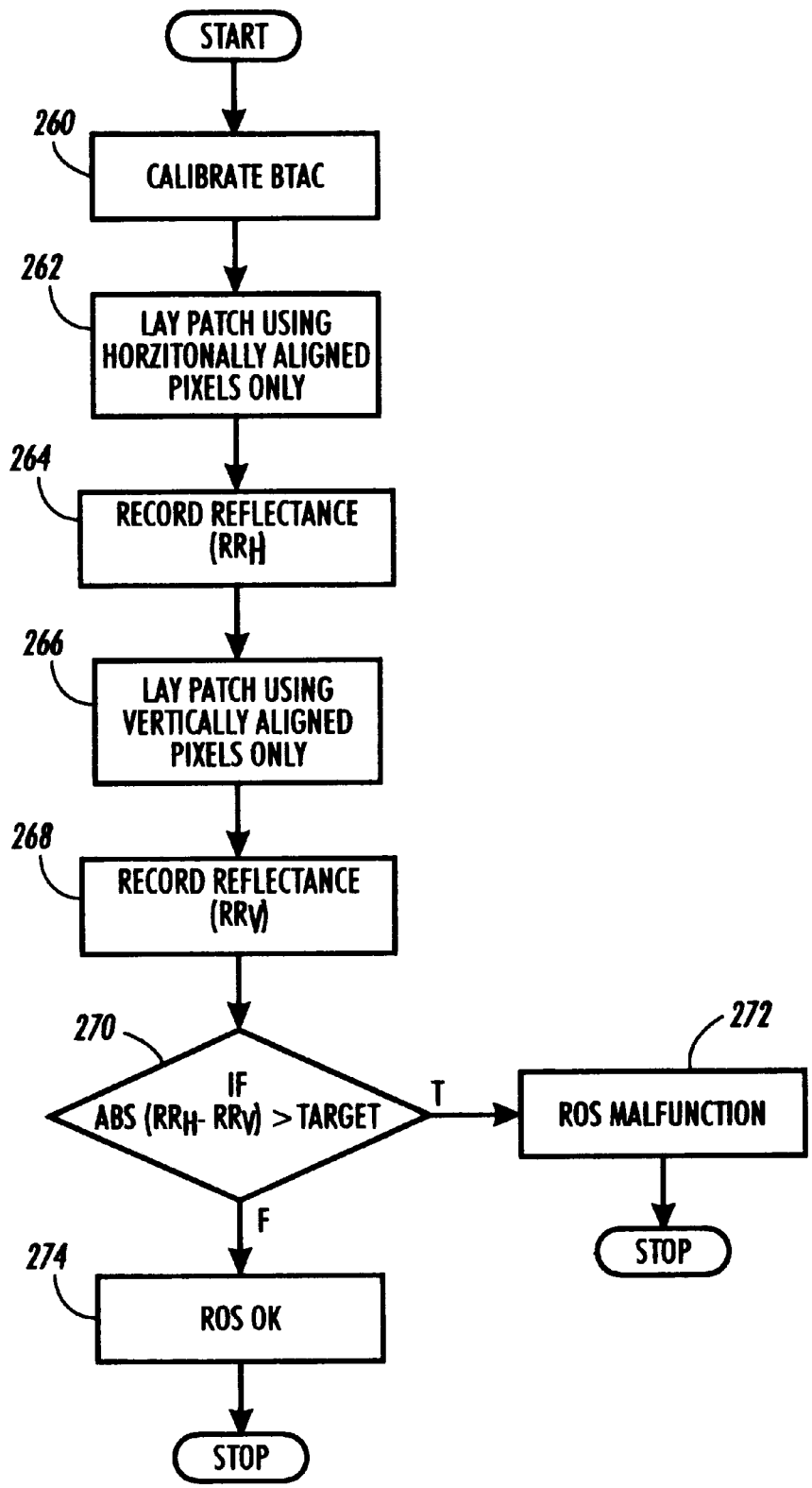
Figure 11:
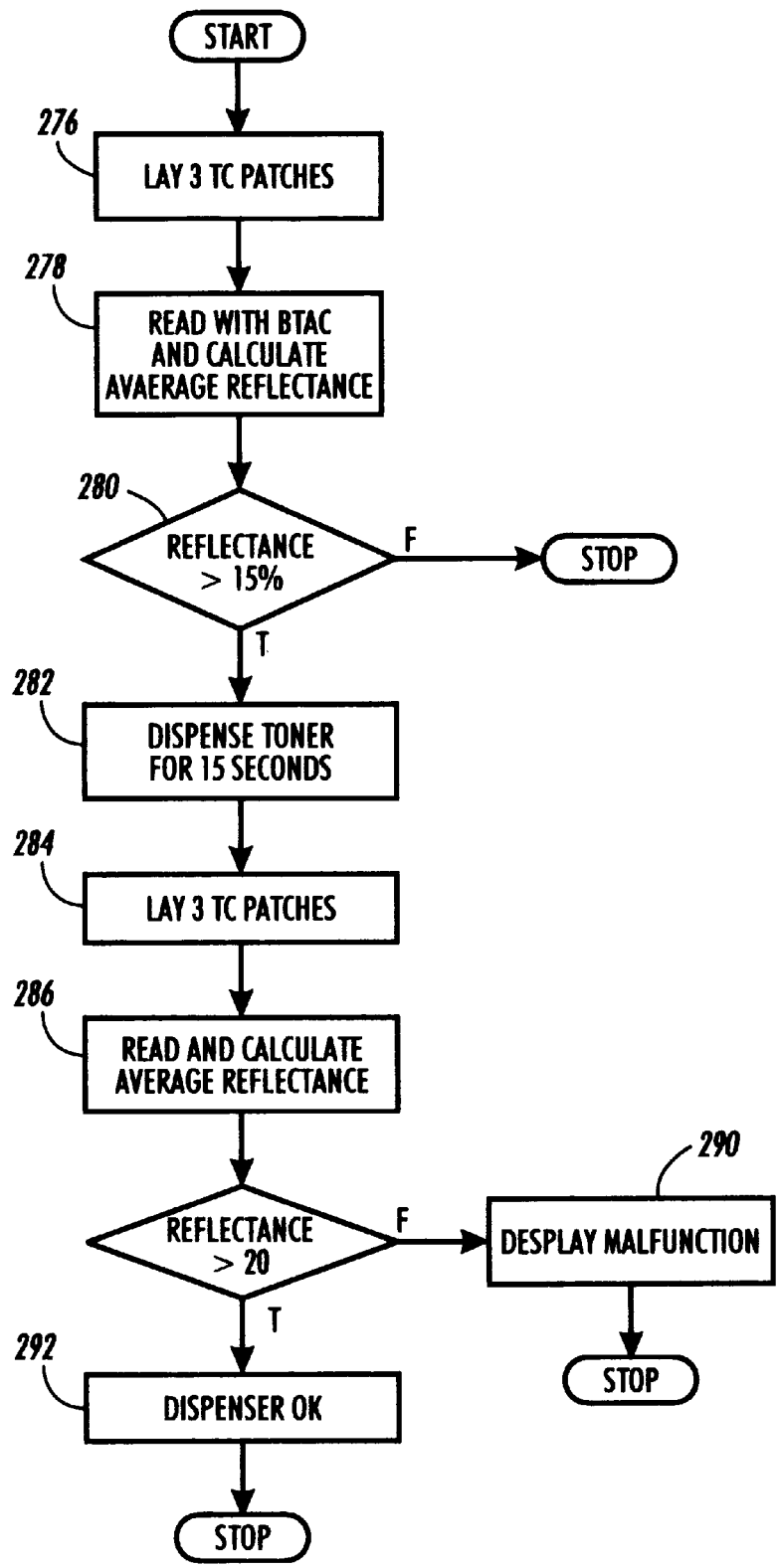
Figure 12:
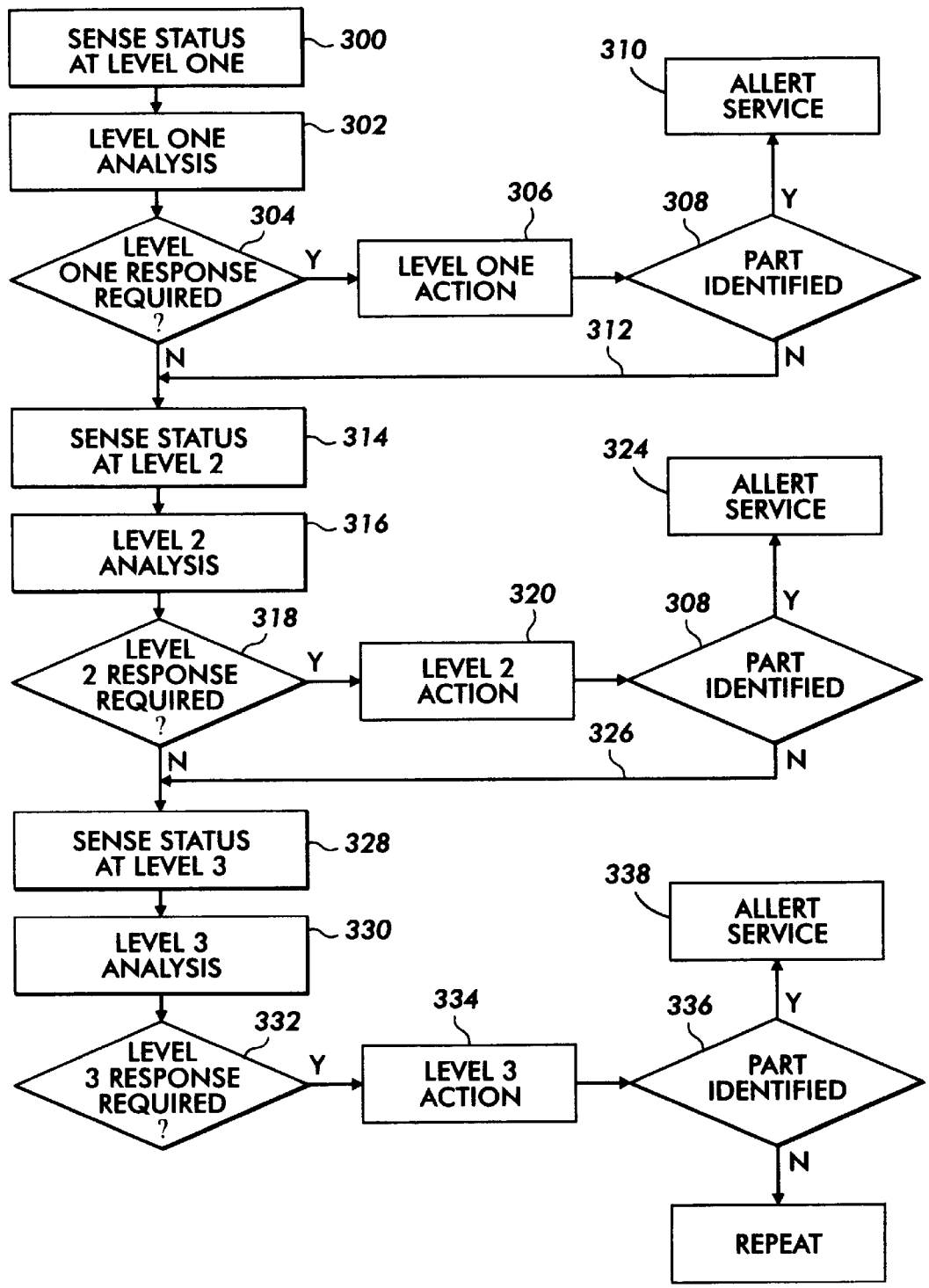
Figure 13:
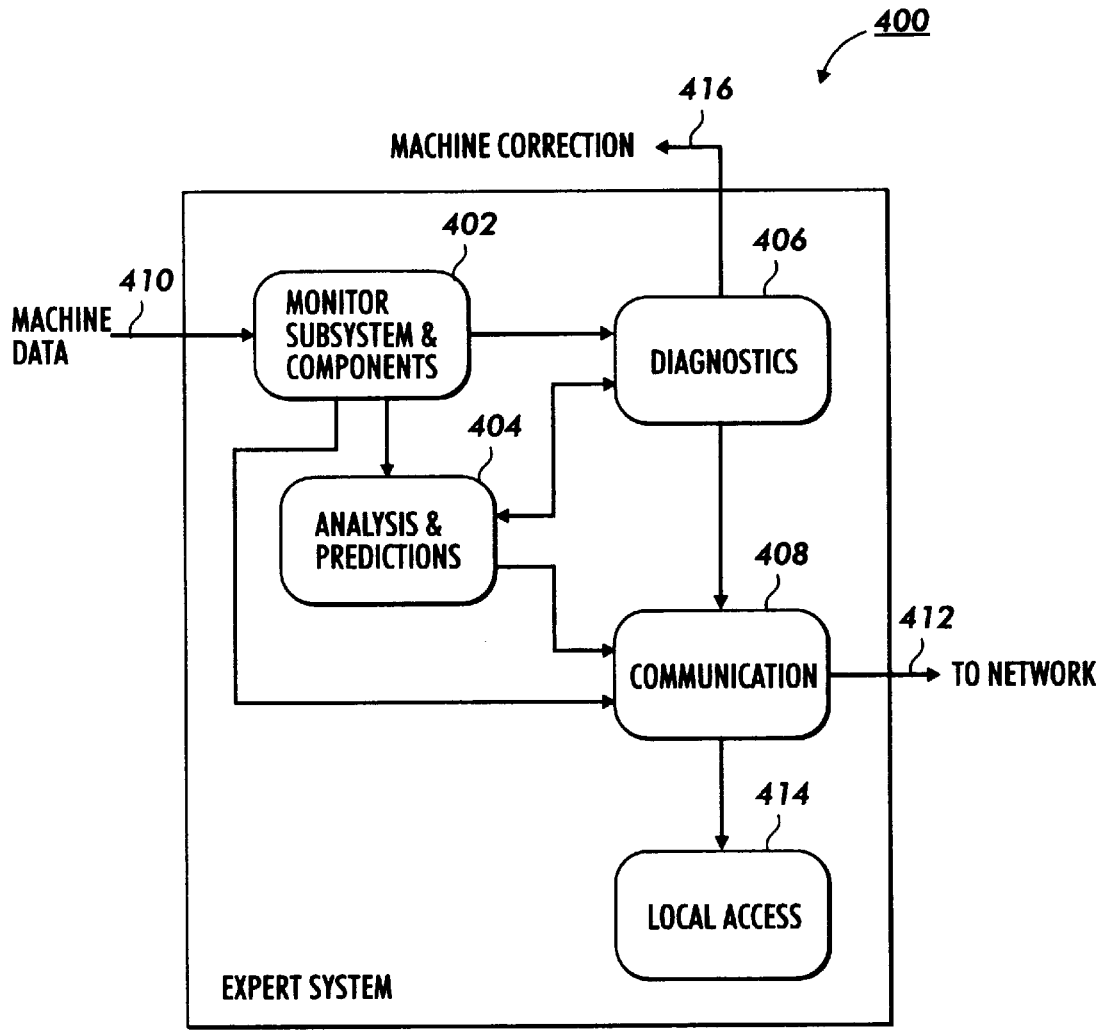
Figure 14:
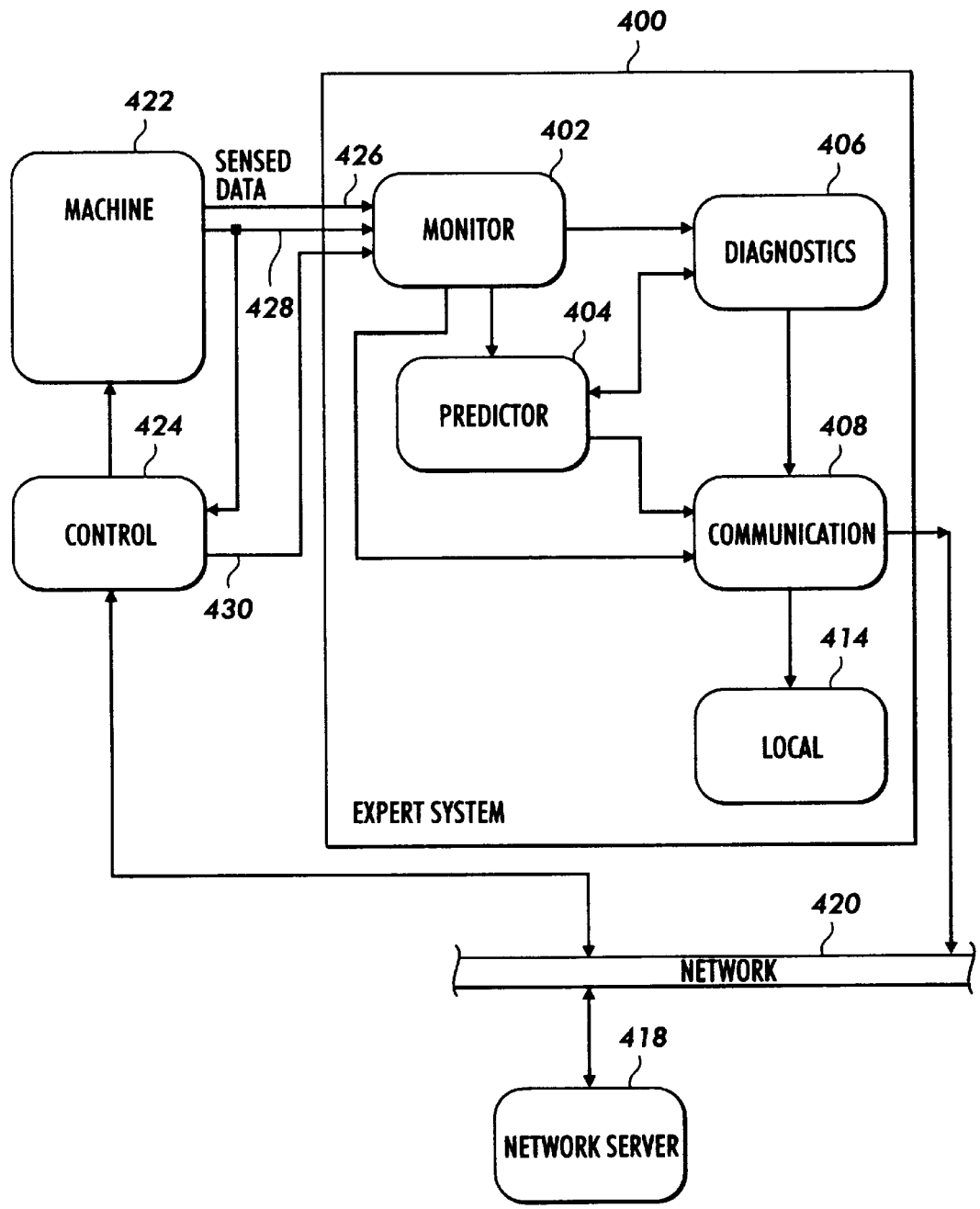

FIGS. 8A, 8B, and 8C illustrate the cleaner stress indicator in accordance with the present invention;

FIGS. 9A and 9B are a more detailed flow chart illustrating actuator performance indicators in accordance with the present invention;

FIG. 10 is a more detailed flow chart illustrating the ROS pixel growth detector in accordance with the present invention;

FIG. 11 is a more detailed flow chart illustrating the toner dispense monitor in accordance with the present invention;

FIG. 12 is a more detailed flow chart showing fault isolation and part replacement in accordance with the present invention; and FIGS. 13 and 14 illustrate the use of Expert Systems both locally and remotely for fault isolation and part replacement.

DETAILED DESCRIPTION OF THE PREFERRED EMBODIMENT

While the present invention will hereinafter be described in connection with a preferred embodiment thereof, it will be understood that it is not intended to limit the invention to that embodiment. On the contrary, it is intended to cover all alternatives, modifications and equivalents that may be included within the spirit and scope of the invention as defined by the appended claims.

Figure 1:
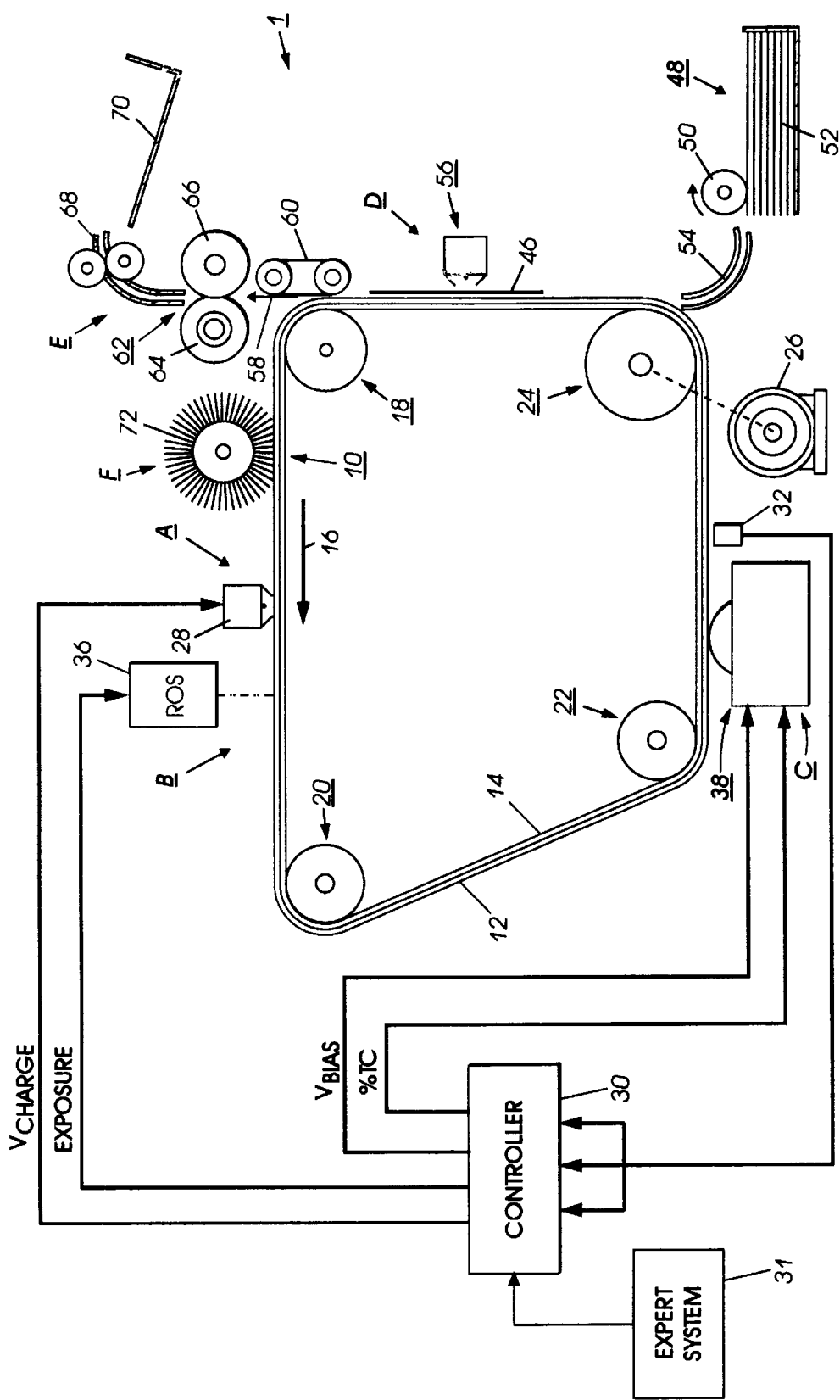
FIG. 1 is an elevational view illustrating a typical electronic imaging system incorporating a technique of fault isolation and part replacement in accordance with the present invention.

Turning to FIG. 1, the electrophotographic printing machine 1 employs a belt 10 having a photoconductive surface 12 deposited on a conductive substrate 14. By way of example, photoconductive surface 12 may be made from a selenium alloy with conductive substrate 14 being made from an aluminum alloy which is electrically grounded. Other suitable photoconductive surfaces and conductive substrates may also be employed. Belt 10 moves in the direction of arrow 16 to advance successive portions of photoconductive surface 12 through the various processing stations disposed about the path of movement thereof. As shown, belt 10 is entrained about rollers 18, 20, 22, 24. Roller 24 is coupled to motor 26 which drives roller 24 so as to advance belt 10 in the direction of arrow 16. Rollers 18, 20, and 22 are idler rollers which rotate freely as belt 10 moves in the direction of arrow 16.

Initially, a portion of belt 10 passes through charging station A. At charging station A, a corona generating device, indicated generally by the reference numeral 28 charges a portion of photoconductive surface 12 of belt 10 to a relatively high, substantially uniform potential.

Next, the charged portion of photoconductive surface 12 is advanced through exposure station B. At exposure station B, a Raster Input Scanner (RIS) and a Raster Output Scanner (ROS) are used to expose the charged portions of photoconductive surface 12 to record an electrostatic latent image thereon. The RIS (not shown), contains document illumination lamps, optics, a mechanical scanning mechanism and photosensing elements such as charged couple device (CCD) arrays. The RIS captures the entire image from the original document and coverts it to a series of raster scan lines. The raster scan lines are transmitted from the RIS to a ROS 36.

ROS 36 illuminates the charged portion of photoconductive surface 12 with a series of horizontal lines with each line having a specific number of pixels per inch. These lines illuminate the charged portion of the photoconductive surface 12 to selectively discharge the charge thereon. An exemplary ROS 36 has lasers with rotating polygon mirror blocks, solid state modulator bars and mirrors. Still another type of exposure system would merely utilize a ROS 36 with the ROS 36 being controlled by the output from an electronic subsystem (ESS) which prepares and manages the image data flow between a computer and the ROS 36. The ESS (not shown) is the control electronics for the ROS 36 and may be a self-contained, dedicated minicomputer. Thereafter, belt 10 advances the electrostatic latent image recorded on photoconductive surface 12 to development station C.

One skilled in the art will appreciate that a light lens system may be used instead of the RIS/ROS system heretofore described. An original document may be positioned face down upon a transparent platen. Lamps would flash light rays onto the original document. The light rays reflected from original document are transmitted through a lens forming a light image thereof. The lens focuses the light image onto the charged portion of photoconductive surface to selectively dissipate the charge thereon. The records an electrostatic latent image on the photoconductive surface which corresponds to the informational areas contained within the original document disposed upon the transparent platen.

At development station C, magnetic brush developer system, indicated generally by the reference numeral 38, transports developer material comprising carrier granules having toner particles adhering triboelectrically thereto into contact with the electrostatic latent image recorded on photoconductive surface 12. Toner particles are attracted form the carrier granules to the latent image forming a powder image on photoconductive surface 12 of belt 10.

After development, belt 10 advances the toner powder image to transfer station D. At transfer station D a sheet of support material 46 is moved into contact with the toner powder image. Support material 46 is advanced to transfer station D by a sheet feeding apparatus, indicated generally by the reference numeral 48. Preferably, sheet feeding apparatus 48 includes a feedroll 50 contacting the uppermost sheet of a stack of sheets 52. Feed roll 50 rotates to advance the uppermost sheet from stack 50 into sheet chute 54. Chute 54 directs the advancing sheet of support material 46 into a contact with photoconductive surface 12 of belt 10 in a timed sequence so that the toner powder image developed thereon contacts the advancing sheet of support material at transfer station D.

Transfer station D includes a corona generating device 56 which sprays ions onto the backside of sheet 46. This attracts the toner powder image from photoconductive surface 12 to sheet 46. After transfer, the sheet continues to move in the direction of arrow 58 onto a conveyor 60 which moves the sheet to fusing station E.

Fusing station E includes a fuser assembly, indicated generally by the reference numeral 62, which permanently affixes the powder image to sheet 46. Preferably, fuser assembly 62 includes a heated fuser roller 64 driven by a motor and a backup roller 66. Sheet 46 passes between fuser roller 64 and backup roller 66 with the toner powder image contacting fuser roll 64. In this manner, the toner powder image is permanently affixed to sheet 46. After fusing, chute 68 guides the advancing sheet to catch tray 70 for subsequent removal from the printing machine by the operator.

Invariably, after the sheet of support material is separated from photoconductive surface 12 of belt 10, some residual particles remain adhering thereto. These residual particles are removed from photoconductive surface 12 at cleaning station F. Cleaning station F includes a preclean corona generating device (not shown) and a rotatably mounted preclean brush 72 in contact with photoconductive surface 12. The preclean corona generator neutralizes the charge attracting the particles to the photoconductive surface. These particles are cleaned from the photoconductive surface by the rotation of brush 72 in contact therewith. One skilled in the art will appreciate that other cleaning means may be used such as a blade cleaner. Subsequent to cleaning, a discharge lamp (not shown) discharges photoconductive surface 12 with light to dissipate any residual charge remaining thereon prior to the charging thereof for the next successive imaging cycle.

A control system coordinates the operation of the various components. In particular, controller 30 responds to sensor 32 and provides suitable actuator control signals to corona generating device 28, ROS 36, and development system 38 which can be any suitable development system such as hybrid jumping development or a mag brush development system. The actuator control signals include state variables such as charge voltage, developer bias voltage, exposure intensity and toner concentration. the controller 30 includes an expert system 31 including various logic routines to analyze sensed parameters in a systematic manner and reach conclusions on the state of the machine. Changes in output generated by the controller 30, in a preferred embodiment, are measured by a toner area coverage (TAC) sensor 32. TAC sensor 32, which is located after development station C, measures the developed toner mass for difference area coverage patches recorded on the photoconductive surface 12. The manner of operation of the TAC sensor 32, shown in FIG. 1, is described in U.S. Pat. No. 4,553,003 which is hereby incorporated in its entirety into the instant disclosure. TAC sensor 32, is an infrared reflectance type densitometer that measures the density of toner particles developed on the photoconductive the surface 12.

Figure 2:
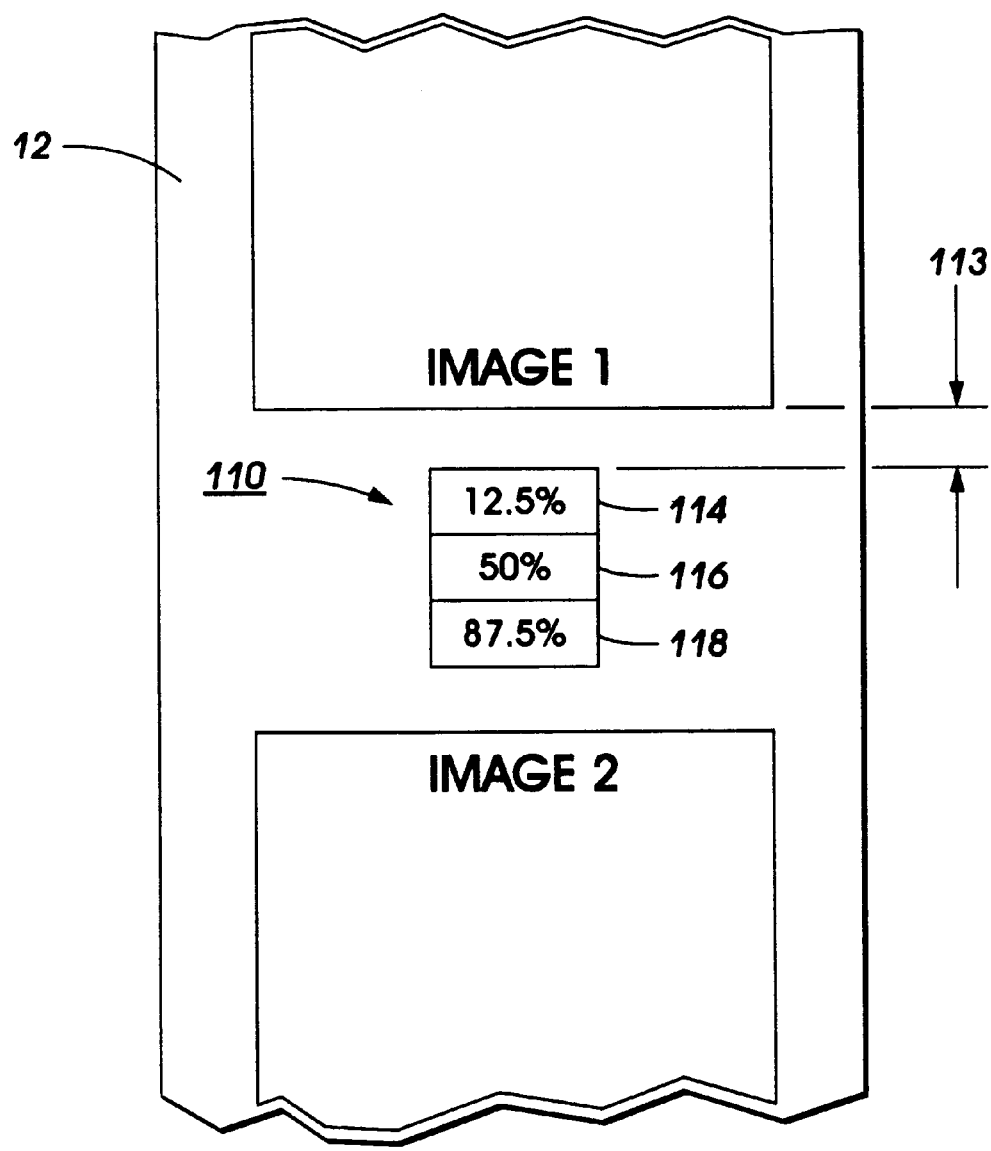
FIG. 2 illustrates the generation of control test patches for use with a toner area coverage sensor.

Referring to FIG. 2, there is illustrated a typical composite toner test patch 110 imaged in the interdocument area of photoconductive surface 12. The photoconductive surface 12, is illustrated as containing two documents images image 1 and image 2. The test patch 110 is shown in the interdocument space between image 1 and image 2 and in that portion of the photoconductive surface 12 sensed by the TAC sensor 32 to provide the necessary signals for control. The composite patch 110, in a preferred embodiment, measures 15 millimeters, in the process direction, and 45 millimeters, in the cross process direction and provides various halftone level patches such as an 87.5% patch at 118, a 50% halftone patch at 116 and a 12.5% halftone patch at 114.

Before the TAC sensor 32 can provide a meaningful response to the relative reflectance of patch, the TAC sensor 32 must be calibrated by measuring the light reflected from a bare or clean area portion 112 of photoconductive belt surface 12. For calibration purposes, current to the light emitting diode (LED) internal to the TAC sensor 32 is increased until the voltage generated by the TAC sensor 32 in response to light reflected from the bare or clean area 112 is between 3 and 5 volts.

It should be understood that the term TAC sensor or "densitometer" is intended to apply to any device for determining the density of print material on a surface, such as a visible-light densitometer, an infrared densitometer, an electrostatic voltmeter, or any other such device which makes a physical measurement from which the density of print material may be determined.

Figure 3:
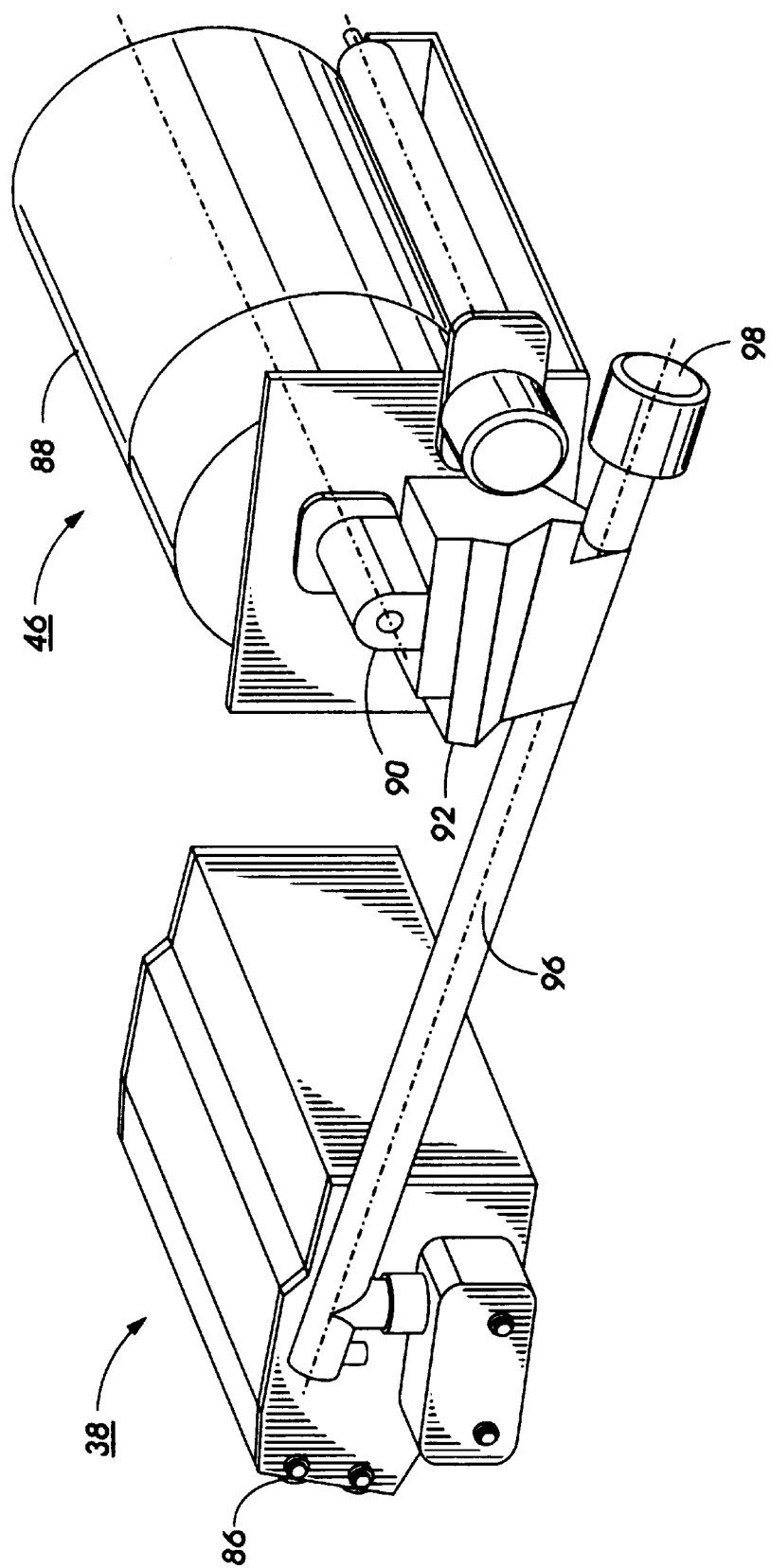
FIG. 3 shows a typical developer and toner dispense system.

FIG. 3 shows in greater detail developer unit 38 illustrated in FIG. 1. The developer unit includes a developer 86 which could be any suitable development system, such as hybrid jumping development or mag brush development, for applying toner to a latent image. The developer is generally provided in a developer housing and the rear of the housing usually forms a sump containing a supply of developing material. A (not shown) passive crossmixer in the sump area generally serves to mix the developing material.

The developer 86 is connected to a toner dispense assembly shown at 46 including a toner bottle 88 providing a source of toner particles, an extracting auger 90 for dispensing toner particles from bottle 88, and hopper 92 receiving toner particles from auger 90. Hopper 92 is also connected to delivery auger 96 and delivery auger is rotated by drive motor 98 to convey toner particles from hopper 92 for distribution to developer 86. It should be understood that a developer or toner dispense assembly could be individual replacement units or a combined replacement unit.

In accordance with the present invention, an expert system is provided, including a computer with ancillary components, as well as software and hardware parts to receive raw data from a TAC sensor. The data is received at appropriate intervals and interpreted to report on the functional status of the subsystems and components of the machine. In addition to direct sensor data received from the machine, a knowledge of the parameters in process control algorithms is comprehended by the expert system in order to account for machine parameter and materials drift and other image quality factors.

In addition, when degradation of components or performance is detected, predictions of the impending failure causes a series of actions to occur, ranging from key operator notification of the predicted need for service to actually placing an order for the appropriate part for "just in time" delivery prior to actual part failure. The expert system is equipped to perform a set of specific functions or tests to instruct a service representative to perform whatever repair, part replacement, etc. that may be necessary for the maintenance and optimum operation of the machine. Such functions include status of periodic parts replacement due to wear or image quality determinations which may require adjustment of operational parameters of various modules or replacement of defective components.

The software that is loaded in such an expert system can be generic to common modules among all machines or specific to the machine that the customer has purchased. The expert system provides the interpretation of the complex raw data that continually emanates from various components and modules of the machine and provides information on the nature of the actions that need to be taken to maintain the machine for optimum performance. The Expert System accepts this raw data and interprets it to provide reduced service time resulting from the specific and correct diagnosis of both actual or predicted failures of machine parts. The Expert System is given very intimate details of the inter workings of the machine being monitored and thus provides similarly detailed information about the state of each individual component. This information is useful not only for field service diagnostics but can also be useful before and after product life in manufacturing by testing the behavior of the individual components and comparing it to a standard in re-manufacturing, remembering exactly the part failed and providing information as a database entry specific to a part and serial number.

There are basically two flavors of the Expert System. A "local" Expert System (including a hand held device) is connected to a single machine or installed in a single machine to perform monitoring, analysis, diagnostic, and communication functions. A second embodiment resides on a network, in a host computer, and provides the diagnostic needs of a population of machines to which is connected. While the diagnostic capability which is embedded within the product itself has the most immediate access to the raw sensor data, the highest potential bandwidth, and the fastest possible response time, it is sometimes limited by cost and functional requirements in the level of analysis, breadth of scope and depth of storage which can be maintained. The remote diagnostic system on the other hand, has the potential for virtually unlimited storage for monitoring and trend analysis and more computational horsepower for a detailed analysis of whatever data can be made available.

Figure 4:
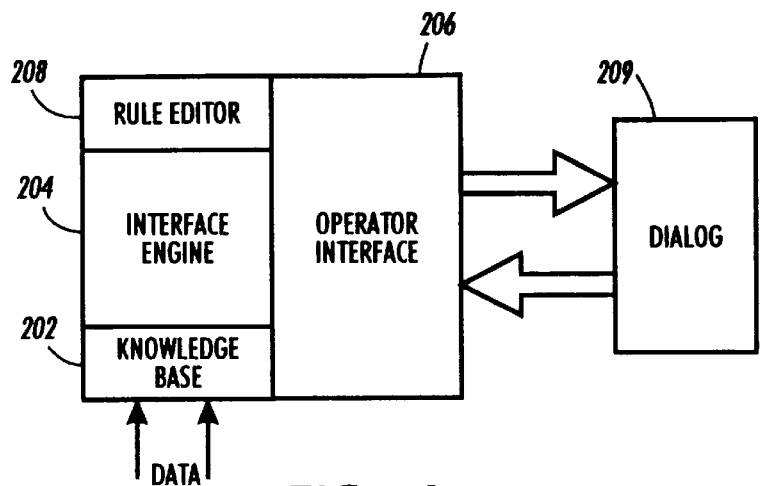
FIG. 4 is a block diagram of an Expert System adapted for use in the present invention.

With reference to FIG. 4, there is shown a general schematic of the Expert System 31 in FIG. 1. The Expert System is generally shown in FIG. 4 including a Knowledge Base 202 having a set of rules embodying an expert's knowledge about the operation, diagnosis, and correction of the machine, an Inference Engine 204 to efficiently apply the rules of the Knowledge Base 202 to solve machine problems, an Operator Interface 206 to communicate between the operator and the Expert System, and Rule Editor 208 to assist in modifying the Knowledge Base 202. In operation, the Inference Engine 204 applies the Knowledge Base 202 rules to solve machine problems, compares the rules to data entered by the user about the problem, tracks the status of the hypothesis being tested and hypotheses that have been confirmed or rejected, asks questions to obtain needed data, states conclusions to the user, and even explains the chain of reasoning used to reach a conclusion. The function of the Operator Interface is to provide dialogue 210, that is, ask questions, request data, and state conclusions in a natural language and translate the operator input into computer language.

The Expert System 196 itself includes memory with a profile of expected machine performance and parameters portion, a current switch and sensor information portion, and a table of historic machine performance and utilization events. The system monitors status conditions and initiates external communication relative to the status conditions of the machine. This procedure includes the steps of monitoring the predetermined status conditions relative to the operation of the machine, recognizing the deviation of the machine operation from said predetermined status conditions, recognizing the inability of the machine to automatically respond to the deviation to self correct, and, determining the need for external response to provide additional information for evaluation for further analysis.

Upon this determination the system will request additional information for evaluation for further analysis, and upon receipt of said additional information, determine the correct response to return the machine operation to a mode not in deviation from said predetermined status conditions. It also automatically provides the correct response to return the machine operation to a mode not in deviation from the predetermined status conditions. The Expert System 196, as discussed, periodically responds to the operating conditions or parameters being analyzed to determine if there is a threshold level or value stored in a threshold file that is outside the range of acceptable machine operation. If all threshold levels are determined to be within acceptable machine operation, no action is taken by the Expert System 196. However, if it is determined that the sensed values from the sensors and detectors represent a condition that is outside the range or accepted level of threshold values as stored in threshold file 194, the Expert System 196 will respond and analyze the data and take corrective action.

Figure 5A:
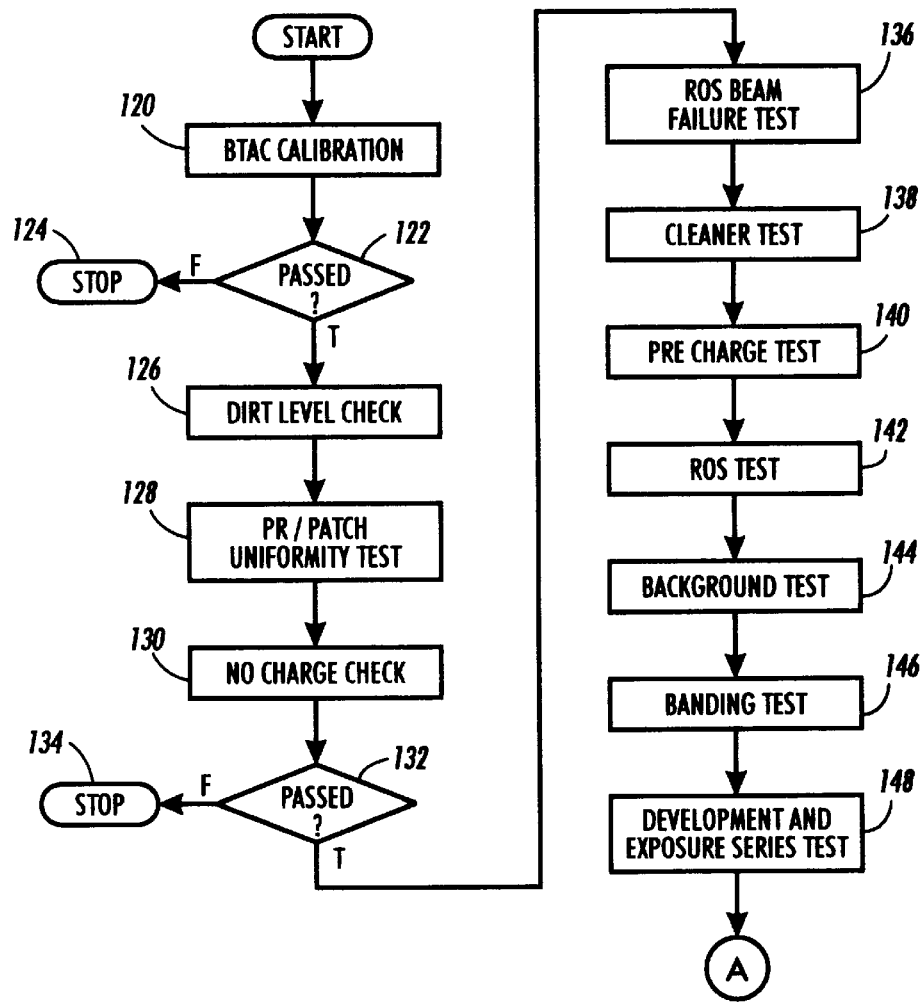
FIGS. 5A and 5B are a general flow chart illustrating a general technique for fault isolation in accordance with the present invention.
Figure 5B:
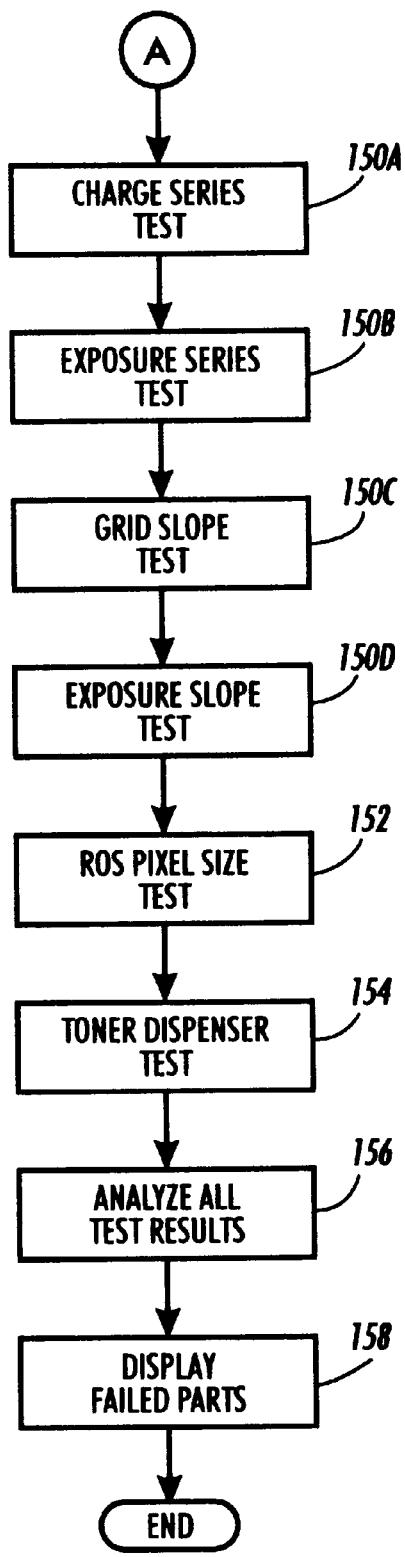

With reference to FIGS. 5A and 5B, according to the present invention, a series of tests, both stand alone and cumulative, logically analyze test results to determine any parts or subsystems needing replacement. These tests are based upon readings of selective test patches by a toner area coverage sensor.

The underlying basis of the invention is that it is cheaper and quicker to replace a part rather than spending valuable service time trying to correct or repair a part or subsystem at the customer's site. In particular, there is provided a highly intelligent, fully automated xerographic diagnostic routine that has the ability to inform the service representative that a specific part or parts need to be replaced. This task was accomplished by designing a series of individual tests that when performed in a logical manner and their results analyzed according to specific paradigms, the net result would point to the failure of one or more individual subsystems within the xerographic engine.

Some of the tests themselves are and could be used as stand alone diagnostic routines. They consist mainly of reading of various halftone and solid area patches by the process control sensors (BTAC, ESV, etc.) created under specific xerographic conditions usually in a before and after situation. The system analyzes the data using highly sophisticated tools (statistic packages, FFT's, etc.), looks at trends and obtains a result. It then combines this result with the results of various other tests and extracts logical conclusions as to the health of a specific subsystem. For example: to test the cleaning subsystem, it may be necessary to concatenate the results of tests A, C, D, & F. For this test, A and D may be weighted more than C and F. The final result is that the cleaner test has some value of 60 with a variance of +/-8%. The failure mode may be >65 (+/-5%). In this instance the cleaning subsystem would have failed.

According to the invention, there is an analysis of all the various test combinations for each part that it needs to interrogate and obtains a parts to replace code. This code is then readily available to be accessed by the service rep either over the phone line or through the portable workstation (PWS). When displayed, a corresponding list of part or parts to replace is presented which relates back to the code. This system will run automatically when certain conditions are met within the process control system or can be called by the operator through the UI or the service rep through the PWS.

It should also be noted that the xerographic engine can be instructed from a remote site to run a setup when needed or to run a diagnostic self analysis routine and return via the phone line any pertinent results and/or parts to replace. Upon receiving the remote command, the xerographic subsystem goes off line, runs the appropriate routine and then returns to a ready state and conveys any information back to the calling center.

In modern xerographic print engines, process controls uses a variety of reflective sensors to monitor and control the tone reproduction curve of the xerographic process. One such sensor is the BTAC (Black Toner Area Coverage) sensor. In a final test for proper operation, the BTAC must be calibrated to the bare reflectance (absence of toner) of the photoreceptor. To achieve this, the output of an LED in the sensor is pulsed (stepped) until a certain analog voltage or level of reflectance is attained. This calibration process is continually repeated.

Figure 6:
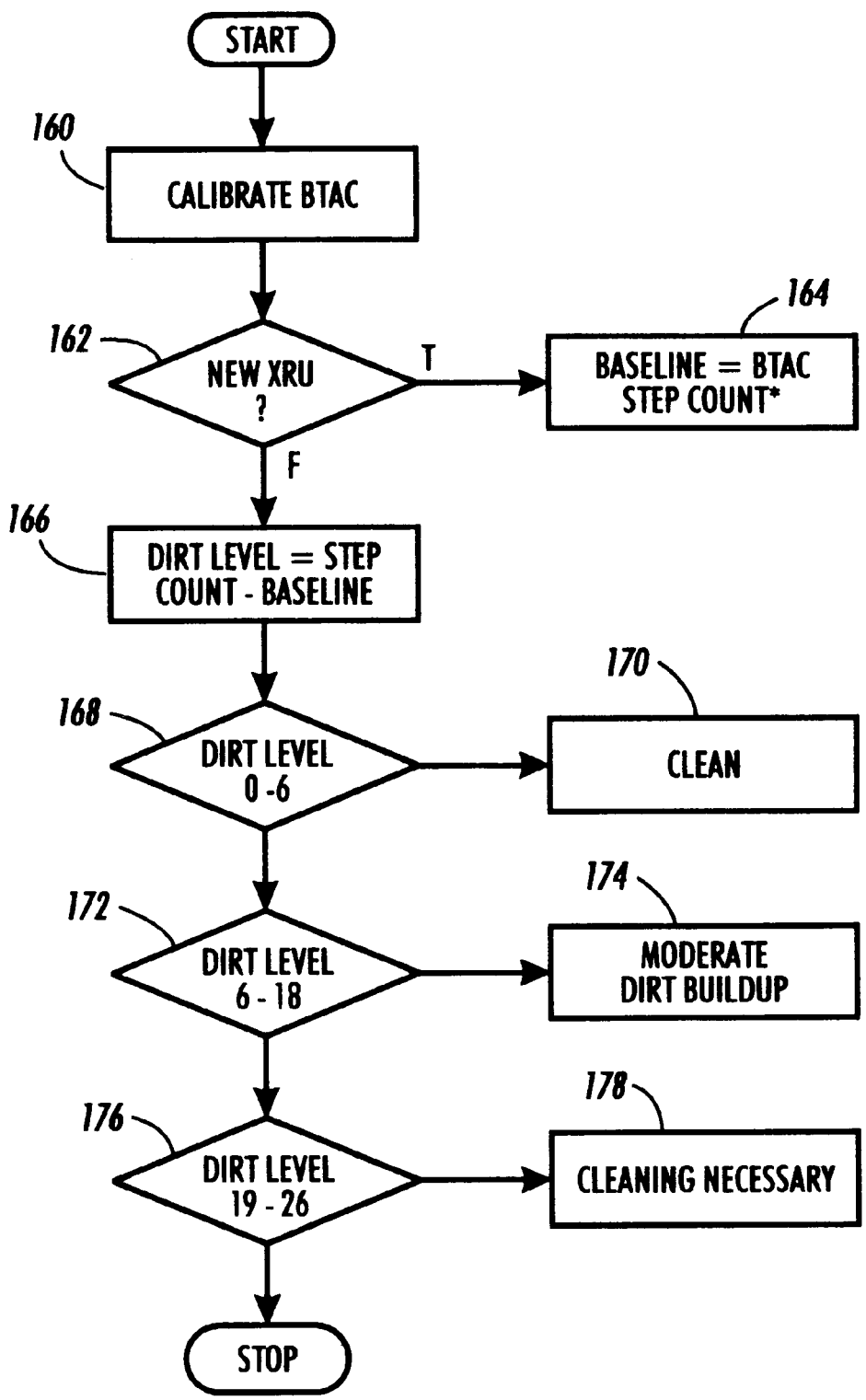
FIG. 6 is a more detailed flow chart illustrating the dirt level early warning technique in accordance with the present invention.

The thrust of this invention is to capture the initial number of steps that it takes to calibrate the photoreceptor on a virgin machine module or customer replaceable unit CRU as shown in FIG. 6. The system knows when the CRU is brand new (and thus free of contamination) by reading an EPROM integrated circuit which is housed in the not shown CRU. Typically a clean photoreceptor will calibrate at 7 or 8 steps which is between 3.7–4.0 volts analog on the sensor (100% reflectance). This step value is then stored in nonvolatile memory (NVM) and used as a baseline. As the contamination (dirt level) increases, the LED steps will increase. On the next calibration (preferably at every cycle up of the xerographic subsystem), the step count is captured. The dirt level is calculated by subtracting the baseline from the current step count:

$$\text{Dirt Level} = \text{current step count} - \text{baseline}$$

This value is then displayed to the user interface. The BTAC sensor has a maximum light output of 24 steps. Therefore the dirt level range is 0–24. A gas gauge display could be used to illustrate a range of conclusions such as clean (range 0–6), moderated dirt build up (range 6–18) and cleaning necessary (range 18–24).

In one embodiment, output is displayed only as a value and it has proved to be a very useful tool and a good indication of the relative contamination level of the BTAC and the xerographic subsystem.

The process control system continuously monitors the state of the xerographic process. Sensors read various halftone patches which are an indication of the quality of the developed image. If the patch quality is not within range, changes are made to various actuators to bring the process back to center. The soundness of the patch is highly effected by the uniform quality of the belt surface. A scratch or defect on the photoreceptor where the patches are produced can change the outcome of a patch read.

Therefore, a second test is to take samples of the entire photoreceptor surface with the Black Toner Area Coverage (BTAC) sensor every 1.5 mm. Using a seam detection algorithm, the seam samples are discarded, and an overall clean belt uniformity measurement is calculated. This value is used as a baseline. Since the seam location was found, the location of each process control patch and its related BTAC readings can be analyzed. The mean and variance are determined for each patch and compared to the baseline value. Through a statistical analysis, the uniformity of each location computed and compared to the baseline. The operator can then be informed to replace the belt if the uniformity was lower than an acceptable level.

Images are written on the photoreceptor by means of a dual beam raster output scanner. Dual beams can produce images twice as fast as a single beam laser. When both lasers malfunction, diagnosis is fairly easy. However, when one fails, it is more difficult to determine the failure mode.

Figure 7:
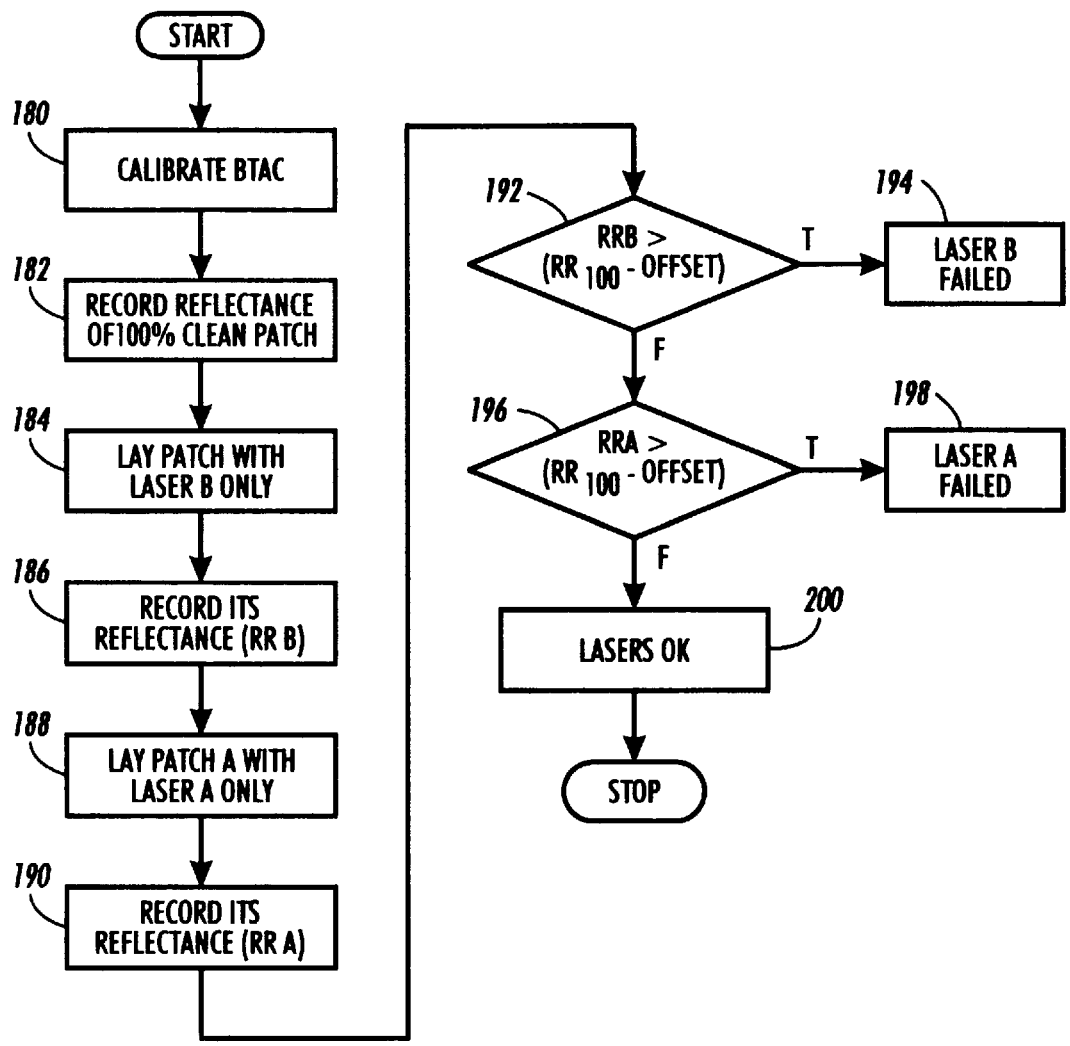
FIG. 7 is a more detailed flow chart illustrating a ROS beam failure test in accordance with the present invention.

The thrust of another feature of the invention, as shown in FIG. 7, to differentiate between laser A and laser B. Knowing the fact that the lasers write alternate scan lines, two halftone patches are created, as illustrated, the first written from laser A only, the second from laser B only.

Patch Pattern Construction

| Laser A | Laser B |
|---------|---------|
| 0 × 00  | 0 × FF  |
| 0 × FF  | 0 × 00  |
| 0 × 00  | 0 × FF  |
| 0 × FF  | 0 × 00  |
| 0 × 00  | 0 × FF  |
| 0 × FF  | 0 × 00  |
| 0 × 00  | 0 × FF  |
| 0 × FF  | 0 × 00  |

The routine first measures with the black toner and area coverage (BTAC) sensor, a 100% reflective (clean) patch and record its value. Next it lays and develops the laser B patch which would print full on from laser B and full off from laser A. The patch is then measured and its reflectance is calculated. A similar patch is created using laser A on and laser B off, and its reflectance also measured and recorded. These patches should be approximately equal to the value of a 50% halftone patch. Now each patch was compared to the clean patch as follows:

laser failed if: laser patch>clean patch−offset

What this states is that the laser patch is higher than a 50% patch and approximately equal to a clean patch. In other words, no patch was developed. The laser had failed to write.

As a cleaning system is a xerographic engine becomes stressed, the overall health of the machine begins to deteriorate. This is due to the fact that unwanted toner is either left on the photoreceptor or it is dispersed throughout the engine. The toner which is not cleaned from the photoreceptor may interfere with the process control patches and inhibit the control algorithms from accurately predicting the "real" state of process. The dispersed toner can contaminate the marking engine and result in a degrading of the overall copy quality of the machine. Having the ability to detect any stress in the cleaning subsystem is a distinct advantage for the reasons stated above.

Another feature of the present invention uses the area coverage sensor (BTAC) and a software algorithm to statistically test the ability of the cleaner to clean the photoreceptor surface as shown in FIGS. 8A, 8B, and 8C. As the photoreceptor is deadcycling, two 0% (clean) patches are laid in the image zones and a series of evenly spaced BTAC reads (>100) are captured for each zone. The mean, variance and standard deviation is now calculated for the data obtained.

Two 50% patches are now laid and developed in the exact same location as the 0% patches. These patches are now cleaned by the cleaner. After this procedure, the series of BTAC reads are repeated and the statistical data is again calculated and stored. The technique compares the before and after statistical data and issues a status indicating a cleaner problem if any of the calculated parameters are above some pre-determined threshold.

Basic xerography is controlled by three subsystems; charge, exposure, and development such as Hybrid Jumping Development. In Discharge Area Development systems, one can develop an image with the absence of charge. This principle makes it possible to devise a logical method for determining certain failure modes of these three actuators. The essence of this feature of the invention is a technique to measure and analyze a series of process control patches from which failure modes can be sorted and deducted as shown in FIG. 9A and 9B.

The first step is to test the charging subsystem. Three different halftone patches (12%, 50%, and 87%) are produced using nominal settings for charge, exposure, and development. The reflectance of each patch is measured with the BTAC sensor. If the level of each patch is within a reasonable range, it is assumed that the charging system is working well. If each patch is measured to be very dark, it is deducted that the charging subsystem is malfunctioning. At this point, the method is halted, and charge is tagged to be faulted.

The second step (if charge is OK) creates a patch by turning off charge and exposure and enabling development. This will create a very dark patch. The level of this patch is measured by the BTAC and the following logic is employed:

| | |
|---|---|
| Very Dark | No Malfunction |
| Dark | Mag Roll Malfunction, Low TC |
| Dark to Light | Donor Roll Malfunction, Background, Intermittent Ground |
| Light | Hjd Power Supply Malfunction, Developer Drives Problem Very Bad Ground |

The third step creates a patch using nominal charge, nominal development, and a very high exposure setting. This will create a very dark patch. The level of this patch is measured by the BTAC and the following logic is employed:

| | |
|---|---|
| Very Dark | No Malfunction |
| Dark | Video Cabling |
| Dark to Light | Bad Ground |
| Light | Video Path |

When reproducing halftones, maintaining uniformity is a primary consideration. When nonuniformity or developability variation also known as strobing, exists it can become a dissatisfier to the customer and may require a service call. The sources of the nonuniformity are many: drives, power supplies, or the photoreceptor ground for example. Determining the source of the nonuniformity can often be time consuming.

The essence of this test is the creation of a highly intelligent, fully automated, diagnostic routine. This is accomplished by taking samples of a 50% halftone over the entire photoreceptor circumference with the BTAC sensor. The samples are taken every 1.5 mm for two belt cycles. Each belt cycle is treated independently. The data is then analyzed. This analysis consists of comparing frequencies calculated by the FFT to previously identified frequencies. The outcome of the analysis is the identification of source of the nonuniformity. This diagnostic can be run remotely (RDT) enabling the service representative to bring the correct part at the time of service, reducing diagnostic time and customer down time.

Images are written on the photoreceptor by means of a Raster Output Scanner. The images themselves are made up of pixels. The pixels are created by the ROS exposing small dots on the photoreceptor and then developer material adhering to the dots creating an image. To maintain proper copy quality, these pixels must be created with the proper energy distribution. When a malfunction occurs in the ROS (wobble, heat rise, electrical noise), the energy distribution becomes distorted and copy quality degrades.

The essence of this aspect of the invention is a technique to discover when the ROS was malfunctioning as shown in FIG. 10. This is accomplished by creating two unique patches (one patch consisting of horizontally aligned pixels, the other with vertically aligned pixels), as shown in patch pattern below:

Patch Pattern Construction

| Horizontal | Vertical |
| --- | --- |
| 11111111 | 10001000 |
| 00000000 | 10001000 |
| 00000000 | 10001000 |
| 00000000 | 10001000 |
| 11111111 | 10001000 |
| 00000000 | 10001000 |
| 00000000 | 10001000 |
| 00000000 | 10001000 |

When developed the reflectance of these patches is read by the BTAC sensor and recorded. If the pixels were being formed correctly, the difference between the two patches would be minute, since the energy dispatched for each patch is the same. However, if the pixels are distorted, the value of one patch would be different than the other and a delta would result. This is due to the integrating properties of the BTAC sensor. Therefore, if the absolute valve is greater than a target valve i.e. (horizontal patch−vertical patch)>target, a possible malfunction could exist in the ROS.

As prints are produced, the developer subsystem needs to be continuously replenished with toner. This is achieved through a toner dispenser subsystem which consists of a dispense motor and a containment reservoir. This system can become inoperative when the motor fails (electrically loses power or the gears become jammed) or the auger within the containment reservoir becomes impacted with toner and binds up.

The essence of this aspect of the invention is to have the process control monitor and detect when any of the above inoperable conditions occur as shown in FIG. 11. This is achieved by laying down on the photoreceptor a toner control patch and measuring its value with the BTAC sensor. If the value is within a reasonable range (the patch does not show that the system is in a very light development condition), toner is now dispensed for a fixed period of time (enough time to redistribute the toner). A second toner control patch is now laid and its value recorded. The system now looks for a delta in the reflectance between the two patches equal to some known value for the rate of toner dispensed. If the dispenser is working correctly, the second patch should have darkened by a certain amount. If the dispenser is dysfunctional, there should have been little or no movement between the first and second patch. In this case, the machine is shut down and a call for service status is displayed.

With respect to FIGS. 5A and 5B there is shown a flow chart of one embodiment of a xerographic xerciser in accordance with the present invention. In particular, a sequence of tests are performed to determine the failure of specific parts or subsystems. Some tests are directly related to a specific part of subsystem whereas the results of other tests may be saved and combined with other tests to determine specific part or subsystem failure. The results of tests can be combined with one or several other tests and can be used in a multiple level or hierarchy of analysis to pinpoint part of subsystem failure.

In block 120, the toner area coverage sensor, in this case, a black toner area coverage (BTAC) sensor is calibrated. A first level of determination is whether or not the sensor passes the calibration standard as shown in block 122, and if so, a next level test, a dirt level check is performed as shown in block 126. If the calibration determination in block 122 fails, the machine is stopped as illustrated in block 124. The dirt level check as illustrated in block 126 is further illustrated in FIG. 6.

After the dirt level check, there is a photoreceptor patch uniformity test as illustrated at block 128. In essence, this test checks for defective areas of a xerographic photoreceptor surface. The result of the previous test is to determine if there is an adequate charge provided by the system charging mechanism, as illustrated in block 130. If there is not an adequate charge, the system stops as shown at block 134. If there is adequate charge, as determined at block 132, a ROS beam failure test is conducted as shown in block 136. Further details of the ROS beam failure test are illustrated in the flow chart in FIG. 7. After the ROS beam failure test, a cleaner test is conducted as illustrated in block 138 and shown in more detail in FIGS. 8A, 8B, and 8C.

A more comprehensive actuator performance indicator test is illustrated in precharged test block 140 and ROS test 142 and shown in detail in the flow chart in FIGS. 9A and 9B. Following the actuator performance indicator tests, there is provided a background test illustrated in block 144 and a banding test illustrated in block 146. Following these tests as illustrated in block 148, there are provided a series of standard charge tests, exposure tests, grid slope tests, and exposure slope tests as illustrated in blocks 150A, 150B, 150C, and 150D. Upon the completion of these tests there is conducted a ROS pixel size test as illustrated in block 152 and illustrated in detail in the flow chart in FIG. 10. Also, there is a toner dispenser test illustrated in block 154 and shown in greater detail in the flow chart in FIG. 11. Finally, as illustrated in blocks 156 and 158, there is an analysis of all the test results and a display of failed parts. A typical scenario of the overall analysis of all the test results is illustrated in the flow chart in FIG. 12.

With reference to FIG. 6, the dirt level check includes the steps of calibrating the BTAC sensor as shown in block 160, and a first determination at block 162 as whether or not the sensor module is new. That is, in a preferred embodiment, the sensor is incorporated into a machine module or customer replaceable unit and the first determination is whether or not this is a new module in the machine or one that has been in the machine and operating. If it is a new module, the sensor is calibrated and the step count of calibration forms the basis for future calibrations and is stored in memory as illustrated in block 164. If the module is not a new module, then as shown in block 166, the number of calibration steps to calibrate the sensor over and above the number of calibration steps to calibrate the sensor when new is provided. A determination is then made of the level of deterioration of sensing capability.

If there is a first number of calibration steps over and above the base calibration level needed, for example, 0–6, as shown in block 168, then the machine is determined to be relatively clean as indicated at block 170. A dirt level of from 6–18 additional calibration steps needed, as shown in block 172, would indicate a moderate dirt build up within the machine as shown at block 174. Finally, a dirt level indication of from 19 to 26 additional steps, as shown in block 176, would indicate that cleaning is necessary as shown in block 178. It should be understood that the number of steps and the ranges of clean, moderate, and cleaning necessary are design considerations and any number of embodiments could be implemented.

With reference to FIG. 7, there is illustrated the ROS beam failure test. In particular, at block 180 the sensor is calibrated and at block 182 a record is made of the reflectance of a 100% clean patch on the photoreceptor. Next, a special patch is laid with laser B only of the dual beam laser. The special patch is such that laser B is modulated and laser A not modulated. The resultant relative reflectance of the patch is recorded and if laser B is operating correctly, there should be approximately 50% halftone reflectance. At block 188, a patch is laid with only laser A modulated due to the special modulating information. A record of the relative reflectance of laser A is recorded as illustrated in block 190. Again, a 50% halftone relative reflectance is expected if laser A is operating correctly. The comparison is made as illustrated in block 192 and if the relative reflectance of laser B is greater than a given threshold, then it is determined that laser B has failed as shown in block 194. Similarly, the relative reflectance of laser A is determined compared to a threshold as shown in block 196, and if the relative reflectance exceeds the threshold, it is determined that laser A has failed as shown in block 198. If neither laser A nor B has failed, then as shown in block 200, both beams are operating correctly.

With reference to FIG. 8A, there are shown two 0% (clean) patches laid in image zones and a series of evenly spaced sensor (BTAC) reads. FIG. 8B illustrates the development of two 5% half tone patches in the same locations as the 0% patches of FIG. 8A. There are no reads of these patches and these patches are then cleaned of toner from the photoreceptor surface. After cleaning, as shown in FIG. 8C, the same sensor reads are again taken as done in FIG. 8A. The before cleaning and after cleaning sensor reads are then compared to give an indication of the efficiency of the cleaner. If the degree of toner that is not cleaned as illustrated by the toner dots in FIG. 8C is above a given threshold, then there is a determination of a cleaner problem or malfunction.

FIGS. 9A and 9B illustrate actuator performance indications. In particular, with reference to FIG. 9A, the calibration of the sensor is shown at block 220. Block 222 illustrates the measurement of the relative reflectance of a clean patch. If the relative reflectance of the patch is less than a given threshold, for example, 45, then there is an indication of a charging problem as shown in block 226. It should be noted that the numeral 45 represents a digitized sensor signal in the range of 0–255 and the number selected is a designed decision based upon machine characteristics. A relative reflectance signal less than 45 indicates very dark patches. If the relative reflectance is not less than 45, then as shown in block 228, the charge and exposure systems are turned off and the development unit enabled.

The relative reflectance of special patches are then measured, for example, a 12%, 50%, and 87% half tone patch. The half tone level of each patch is measured by the sensor. If the relative reflectance is greater than 120 as illustrated in block 230, indicating a very light response, then there is indicated a range of problems as illustrated in block 232. On the other hand, if the relative reflectance is less than 120 but greater than 60 as illustrated in decision block 234, indicating a dark to light response, then there is an indication of a set of malfunctions as illustrated in block 236. If the relative reflectance is less than 60 but greater than 35 as illustrated in block 238, indicating a dark response, then another set of problems are indicated as illustrated at block 240. Finally, if the relative reflectance is less than 35 indicating a very dark response, then no malfunction is indicated and the development system is operational as shown in block 242.

The next step is to set the charge and development to nominal to create a patch with a high exposure setting and determine the relative reflectance. As illustrated in block 246, if the relative reflectance digitized signal is greater than 120, indicating a light patch, a video path problem is indicated as shown in block 248. If the relative reflectance is less than 120 but greater than 80 as shown in block 250, indicating a dark to light patch, then there is determined a bad ground as shown in block 252. On the other hand, if the relative reflectance is less than 80 but greater than 40, a dark patch illustrated in block 254, there is an indication of a video cabling problem as shown in block 256. Finally, if the relative reflectance is less than 40, indicating a very dark patch, there is a determination of no malfunction with the ROS system as shown in block 258.

With reference to FIG. 10, there is illustrated a ROS pixel size growth detector procedure. In particular, at block 260 the sensor is calibrated, and, as shown in block 262, a patch is provided using horizontally aligned pixels. The relative reflectance of this patch is recorded as illustrated in block 264 and in block 266 a patch using vertically aligned pixels is provided. In block 268 the relative reflectance of this patch is recorded. If the absolute value of the difference of these two relative reflectance readings is greater than a given target value, as illustrated in block 270, then there is determined to be a ROS malfunction as shown in block 272. If the difference is less than a target value, then the ROS is determined to be operational as shown in block 274.

With reference to FIG. 11, there is shown in the flow chart a technique to monitor toner dispense. In particular, three special toner concentration patches are provided on the photoreceptor surface as illustrated in block 276. The details of these three special patches are described in pending U.S. Ser. No. 926,476 (D/97101) filed Sep. 10, 1997, incorporated herein. The patches are read by the BTAC sensor and an average reflectance calculated as shown in block 278. If the reflectance with reference to a clean patch is greater than 15% as illustrated in decision block 280, then there is a determination of a normal toner concentration. However, if the average reflectance is less than 15%, then as illustrated in block 282, the tones dispense is activated for 15 seconds.

It should be noted that 15 seconds is a design choice and in one embodiment is the time for toner to get from a toner bottle dispenser on to the photoreceptor and sensed by the sensor. After activation of the toner dispenses for a given period of time, again three toner concentration patches are provided as illustrated at block 284. Again there is a sensing and calculation of the average reflectance as shown in block 286. If the reflectance is greater than 20 as illustrated in the decision block 288, then the dispenser is determined to be operational as shown in block 292. On the other hand, if the reflectance is 20 or less, there is a determination as shown in block 290 that there is a toner dispense malfunction.

With reference to FIG. 12, there is disclosed in flowchart form, a given scenario for progressive levels of monitoring, analysis, and diagnostics for a given machine. At block 300, there is illustrated the sensing of status for a given machine at level 1. It should be understood that a level 1 status could be running a set of first level tests for a given sensor to identify deteriorating parts or subsystems at the first level. Block 302 illustrates a level 1 analysis and in decision block 304, there is a determination based upon the level 1 analysis at 302 whether or not a level 1 response is required. A response as shown at blocks 306 and 308 could be the determination of a part needing replacement and notification or alert provided as illustrated at block 310. Level 1 could be a direct analysis of specific components based upon the sensed data at hand and could include some level of trend tracking such as tracking machine fault trends, tracking component wear, and tracking machine usage.

Assuming no level 1 response is indicated at block 310 that would require a machine shutdown, there is a sensing of machine status at a level 2 and a level 2 analysis as illustrated at blocks 314 and 316. It should be understood that a level 2 status could be running a set of second level tests for a given sensor to identify deteriorating parts or subsystems. A level 2 analysis could also incorporate results of tests or additional sensor measurements at the first level. At decision block 318, there is a determination based upon the level 2 analysis at 316 whether or not a level 2 response or action is required. A response as shown at blocks 320 and 322 again could be the determination of a part needing replacement and notification or alert provided as illustrated at block 324. Level 2 could be a direct analysis of specific components based upon the sensed data at hand or could be indirect analysis based upon inferences from sensed data. Level 2 also could include tracking machine fault trends, tracking component wear, and tracking machine usage. At a level 2 analysis, additional sensors or additional control and first level diagnostic analysis information is considered.

Assuming no level 2 response is indicated at block 324 that would require a machine shutdown, there is a sensing of machine status at a level 3 and a level 3 analysis as illustrated at blocks 328 and 330. It should be understood that a level 3 status could be running a set of third level tests and could also incorporate results of tests or additional sensor measurements at the first and second levels. At decision block 332, there is a determination based upon the level 3 analysis at 330 whether or not a level 3 response or action is required. A response as shown at blocks 334 and 336 again could be the determination of a part needing replacement and notification or alert provided as illustrated at block 338. Level 3 again could be a direct analysis of specific components based upon the sensed data at hand or could be indirect analysis based upon inferences from sensed data at levels 1 and 2. Level 3 again could include tracking machine fault trends, tracking component wear, and tracking machine usage.

It should be understood that FIG. 12 is merely one scenario or example of the use of part replacement identification using an Expert System and a system of progressing through various tests and levels of analysis to specifically identify a part or subsystem for replacement. This includes the display and notification of the replacement part either locally at the machine or remotely to the appropriate service organization.

With reference to FIG. 13, there is illustrated a more practical example of an Expert System in accordance with the present invention. The Expert System generally shown at 400, includes a subsystem and component monitor 402, an analysis and predictions component 404, a diagnostic component 406, and a communication component 408. It should be understood that suitable memory is inherent in the system 400 in the monitor, analysis and predictions, diagnostics, and communication components. The monitor element contains a pre-processing capability including a feature extractor which isolates the relevant portions of data to be forwarded on to the analysis and diagnostic elements. In general, the monitor element 402 receives machine data as illustrated at 410 and provides suitable data to the analysis and predictions component 404 to analyze machine operation and status and track machine trends such as usage of disposable components as well as usage data, and component and subsystem wear data.

Diagnostic component 406 receives various machine sensor and control data from the monitor 402 as well as data from the analysis and prediction 404 to provide immediate machine correction as illustrated at 416 as well as to provide crucial diagnostic and service information through communication component 408 on line 412 to an interconnected network to a remote Expert System on the network such as a centralized host machine with various additional diagnostic tools. Included can be suitable alarm condition reports, requests to replenish depleted consumables, specific part or subsystem replacement data, and data sufficient for a more thorough diagnostics of the machine. Also provided is a local access 414 or interface for a local service representative to access various analysis, prediction, and diagnostic data stored in the system 400 as well as to interconnect any suitable diagnostic device.

With reference to FIG. 14, there is disclosed a typical machine Expert System 400 interconnected to a printing or any other suitable electronic imaging machine 422 as well as connected to network 420. It should be understood that the scope of the present invention contemplates various configurations of a machine Expert System as well as interconnections to machines networks and other network Expert Systems. It should be understood that the present invention encompasses various alternatives of a machine Expert System such as analysis and predictor elements, a diagnostic element capable of a hierarchy of diagnostic levels, and various configurations to receive sensed data and controlled data from a machine. For example, in FIG. 14 certain sensed data illustrated at 428 is provided both to the monitor 402 and machine control 424. Other data illustrated at 426 is provided directly only to monitor 402, which also receives control data on line 430. Both the communication element 408 and control 424 are shown as connected to the network 420. Network server 418 connected to network 420 provides a higher level of analysis and diagnostics to machine 22 than the Expert System 400 and provides a higher level of analysis and diagnostics to other machines on the network.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

What is claimed is:

1. In an image processing machine including a control, a dual beam laser scanner, and a sensor system to monitor developed process control test patches, a method to determine laser beam failure comprising the steps of:

monitoring the reflectance of a bare photoreceptor test patch and recording a value, developing a first special test patch with a first laser beam on and a second laser beam off, the first special test patch providing an approximately 50% halftone developed signal if the first laser beam is operative, developing a second special test patch with the second laser beam on and the first laser beam off, the second special test patch providing an approximately 50% halftone developed signal if the second laser beam is operative, comparing the halftone developed signals from both the first and second special test patches to the reference signal, and determining the operability of the first and second laser beams.

2. The method of claim 1 wherein the sensor system includes a toner area coverage sensor.

3. In an image processing machine including a control, a multiple beam raster output scanner, and a sensor system to monitor developed process control test patches, a method to determine raster output scanner beam failure comprising the steps of:

developing a first special test patch with a first scanner beam on and any other scanner beams off, the first special test patch providing a first developed patch signal, comparing the first developed signal to an expected developed patch signal if the first scanner beam is operative, determining the operability of the first scanner beam, developing a second special test patch with a second scanner beam on and any other scanner beams off, the second special test patch providing a second developed patch signal, comparing the second developed patch signal to an expected developed patch signal if the second scanner beam is operative, determining the operability of the second scanner beam, repeating the steps of developing, comparing, and determining for any additional scanner beams, and determining the overall operability of the raster output scanner.

4. The method of claim 3 wherein the first and second special test patches are specific patterns to provide a given halftone reflectance.

5. The method of claim 4 wherein the given halftone reflectance is approximately 50%.

6. The method of claim 3 wherein the raster output scanner is a dual laser beam.

7. In an image processing machine including a control, a multiple beam laser scanner, and a sensor system to monitor developed process control test patches, a method to determine laser beam failure comprising the steps of:

monitoring the reflectance of a bare photoreceptor test patch and recording a value, developing a first special test patch with a first laser beam on, any other laser beam remaining off, the first special test patch providing a given halftone patch developed signal if the first laser beam is operative, repeating the steps of developing a special test patch with each laser beam on with any other laser beam remaining off, comparing the halftone developed signals to a reference signal, and determining the operability of each of the laser beams.

8. The method of claim 7 wherein the sensor system includes a toner area coverage sensor.

9. The method of claim 7 wherein the multiple beam laser is a dual beam laser.

10. The method of claim 7 wherein the special test patch provides an approximately 50% halftone developed signal.

11. In an image processing machine including a control, a multiple beam raster output scanner, and a sensor system to monitor developed process control test patches, a method to determine raster output scanner beam failure comprising the steps of:

developing a first special test patch, the first special test patch providing a first developed patch signal, comparing the first developed signal to an expected developed patch signal to determine the operability of the first scanner beam, developing a second special test patch, the second special test patch providing a second developed patch signal, comparing the second developed patch signal to an expected developed patch signal to determine the operability of the second scanner beam, repeating the steps of developing and comparing to determine the operability of the raster output scanner.

12. The method of claim 11 wherein the special test patches are specific patterns to provide a given halftone reflectance.

13. The method of claim 11 wherein the given halftone reflectance is approximately 50%.

14. The method of claim 11 wherein the raster output scanner is a dual laser beam.

15. In an image processing machine including a control, a dual beam laser scanner, and a sensor system to monitor developed process control test patches, a method to determine laser beam failure comprising the steps of:

developing a first special test patch, the first special test patch providing a given halftone developed signal, developing a second special test patch, the second special test patch providing a given halftone developed signal, comparing the halftone developed signals from both the first and second special test patches to a reference signal, and determining the operability of the first and second laser beams.

* * * * *